US011920608B2

(12) United States Patent
Yamamoto et al.

(10) Patent No.: US 11,920,608 B2
(45) Date of Patent: Mar. 5, 2024

(54) AXIAL FAN, AIR-SENDING DEVICE, AND REFRIGERATION CYCLE APPARATUS

(71) Applicant: Mitsubishi Electric Corporation, Tokyo (JP)

(72) Inventors: Katsuyuki Yamamoto, Tokyo (JP); Takahide Tadokoro, Tokyo (JP); Takuya Teramoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 17/603,989

(22) PCT Filed: Jun. 13, 2019

(86) PCT No.: PCT/JP2019/023402
§ 371 (c)(1),
(2) Date: Oct. 15, 2021

(87) PCT Pub. No.: WO2020/250364
PCT Pub. Date: Dec. 17, 2020

(65) Prior Publication Data
US 2022/0196029 A1 Jun. 23, 2022

(51) Int. Cl.
*F04D 29/38* (2006.01)

(52) U.S. Cl.
CPC ........... *F04D 29/38* (2013.01); *F04D 29/382* (2013.01); *F04D 29/384* (2013.01); *F05D 2240/304* (2013.01)

(58) Field of Classification Search
CPC ...... F04D 29/38; F04D 29/382; F04D 29/384; F05D 2240/304
See application file for complete search history.

(56) References Cited

U.S. PATENT DOCUMENTS 9,605,686 B2 * 3/2017 Hamada ................ F04D 29/386
2011/0023526 A1 * 2/2011 Ohyama ................ F04D 29/30
416/223 R (Continued)

FOREIGN PATENT DOCUMENTS

JP H05-340392 A 12/1993
JP H07-077198 A 3/1995

(Continued)

OTHER PUBLICATIONS

Kumon et al (WO 2018020708) English Translation (Year: 2018).*

(Continued)

*Primary Examiner* — Brian Christopher Delrue
(74) *Attorney, Agent, or Firm* — POSZ LAW GROUP, PLC

(57) ABSTRACT

An axial fan includes a hub having a rotation shaft and configured to be driven to rotate and blades provided to the hub. The blades each have a front edge portion and a rear edge portion. A first blade section is a section of a portion between the front edge portion and the rear edge portion of each of the blades along a direction in which the blades rotate, and the first blade section is an area of each of the blades that is further inward than an outer periphery edge portion that is a most radially outer periphery in each of the blades. In the first blade section, the blades each have a projection portion and a first recess portion. The projection portion projects from a portion of a pressure surface of each of the blades. The first recess portion recedes from a portion of the pressure surface that is between the projection portion and the rear edge portion. The projection portion has a projection top that is a top of the projection portion and is closer to the rear edge portion than is a center between the front edge portion and the rear edge portion in the first blade section.

14 Claims, 19 Drawing Sheets

(56) References Cited

U.S. PATENT DOCUMENTS

| | | | | |
|---|---|---|---|---|
| 2013/0125579 | A1* | 5/2013 | Okazawa | F24F 1/38 415/220 |
| 2016/0115969 | A1 | 4/2016 | Yamashita et al. | |
| 2022/0186742 | A1* | 6/2022 | Tadokoro | F04D 29/384 |

FOREIGN PATENT DOCUMENTS

| | | | | | |
|---|---|---|---|---|---|
| JP | 2001-280293 | A | | 10/2001 | |
| JP | 2004-124748 | A | | 4/2004 | |
| JP | 2008-051074 | A | | 3/2008 | |
| JP | 2010-150945 | A | | 7/2010 | |
| JP | 2010150945 | A | * | 7/2010 | |
| JP | 2016-084746 | A | | 5/2016 | |
| JP | 2018141371 | A | * | 9/2018 | |
| JP | 6604981 | B2 | * | 11/2019 | |
| WO | 2018/020708 | A1 | | 2/2018 | |
| WO | WO-2018020708 | A1 | * | 2/2018 | F04D 29/38 |

OTHER PUBLICATIONS

Examination Report dated Mar. 10, 2022 issued in corresponding IN patent application No. 202127050531.

Office Action dated Nov. 1, 2022 issued in corresponding JP Patent Application No. 2021-525493 (and English translation).

International Search Report of the International Searching Authority dated Sep. 10, 2019 in corresponding International Patent Application No. PCT/JP2019/023402 (and English translation).

Extended European Search Report dated May 18, 2022 issued in corresponding European Patent Application No. 19932733.9.

Hearing Notice dated Dec. 19, 2023 issued in corresponding IN Patent Application No. 202127050531 (and English translation).

* cited by examiner

Comparative Example

Comparative Example

AXIAL FAN, AIR-SENDING DEVICE, AND REFRIGERATION CYCLE APPARATUS

CROSS REFERENCE TO RELATED APPLICATION

This application is a U.S. national stage application of PCT/JP2019/023402 filed on Jun. 13, 2019, the contents of which are incorporated herein by reference.

TECHNICAL FIELD

The present disclosure relates to an axial fan including a plurality of blades, an air-sending device including the axial fan, and a refrigeration cycle apparatus including the air-sending device.

BACKGROUND ART

Some axial fan includes a plurality of blades along a circumferential surface of a cylindrical boss, and is configured to convey a fluid with the blades rotating with a rotative force applied to the boss. Rotation of the blades of the axial fan causes a portion of the fluid that is present between the blades to collide with blade surfaces. The surfaces with which the fluid collides are subjected to raised pressures, and the fluid is moved by being pressed in a direction of an axis of rotation serving as a central axis on which the blades rotate.

Among such axial fans, there has been proposed an axial fan having, in a portion excluding a rear edge portion in a direction of rotation and in an outermost peripheral position in the direction of the radius of the axial fan, an inflection surface portion projecting toward a positive-pressure side (see, for example, Patent Literature 1). The inflection surface portion of the axial fan of Patent Literature 1 is subjected to a reduced pressure by an increase in speed of a flow on a pressure surface of the inflection surface portion. Therefore, the axial fan of Patent Literature 1 can inhibit the growth of a blade tip vortex because of a reduced pressure difference between the pressure of the pressure surface and the pressure of a suction surface of the inflection surface portion.

CITATION LIST

Patent Literature

Patent Literature 1: Japanese Unexamined Patent Application Publication No. 2008-51074

SUMMARY OF INVENTION

Technical Problem

However, when an inflection surface portion projecting toward a positive-pressure side is provided on the outermost periphery of an axial fan as in the case of the axial fan of Patent Literature 1, a flow of gas of a radial component toward an outer periphery is generated on a pressure surface of a blade by a pressure reduced by the inflection surface portion and a pressure difference on a radially inner periphery. Therefore, the axial fan of Patent Literature 1 may induce the growth of a blade tip vortex, as the flow of gas leaks from a positive-pressure blade surface toward a suction surface at an outer periphery end portion.

The present disclosure is intended to solve such a problem, and has as an object to provide an axial fan configured to reduce leakage of a flow of gas from a positive-pressure blade surface at an outer periphery end portion and inhibit the growth of a blade tip vortex, an air-sending device including the axial fan, and a refrigeration cycle apparatus including the air-sending device.

Solution to Problem

An axial fan according to an embodiment of the present disclosure includes a hub having a rotation shaft and configured to be driven to rotate and blades provided to the hub. The blades each have a front edge portion and a rear edge portion. A first blade section is a section of a portion between the front edge portion and the rear edge portion of each of the blades along a direction in which the blades rotate, and the first blade section is an area of each of the blades that is further inward than an outer periphery edge portion that is a most radially outer periphery in each of the blades, In the first blade section, the blades each have a projection portion and a first recess portion. The projection portion projects from a portion of a pressure surface of each of the blades. The first recess portion recedes from a portion of the pressure surface that is between the projection portion and the rear edge portion. The projection portion has a projection top that is a top of the projection portion and is closer to the rear edge portion than is a center between the front edge portion and the rear edge portion in the first blade section.

An air-sending device according to an embodiment of the present disclosure includes the axial fan thus configured, a drive source configured to apply a drive force to the axial fan, and a casing that houses the axial fan and the drive source.

A refrigeration cycle apparatus according to an embodiment of the present disclosure includes the air-sending device thus configured and a refrigerant circuit having a condenser and an evaporator. The air-sending device is configured to send air to at least either the condenser or the evaporator.

Advantageous Effects of Invention

According to an embodiment of the present disclosure, the axial fan has its projection portion provided in the area that is further inward than is the outer periphery edge portion that is the most radially outer periphery of the axial fan. Therefore, the axial fan uses the projection portion to produce a difference in pressure of gas on the pressure surface of each of the blades to generate a flow of gas of a radial component toward an inner periphery. As a result, the axial fan can reduce leakage of gas flowing from the pressure surface toward a suction surface at the outer periphery edge portion and inhibit the growth of a blade tip vortex.

DESCRIPTION OF EMBODIMENTS

In the following, an axial fan, an air-sending device, and a refrigeration cycle apparatus according to embodiments are described with reference to the drawings. In the following drawings including FIG. 1, relative relationships in dimension between constituent elements, the shapes of the constituent elements, or other features of the constituent elements may be different from actual ones. Further, constituent elements given identical reference signs in the following drawings are identical or equivalent to each other, and these reference signs are adhered to throughout the full text of the description. Further, the directive terms (such as "upper", "lower", "right", "left", "front", and "back") used as appropriate for ease of comprehension are merely so written for convenience of explanation, and are not intended to limit the placement or orientation of a device or a component.

Embodiment 1

[Axial Fan 100]

Figure 1:
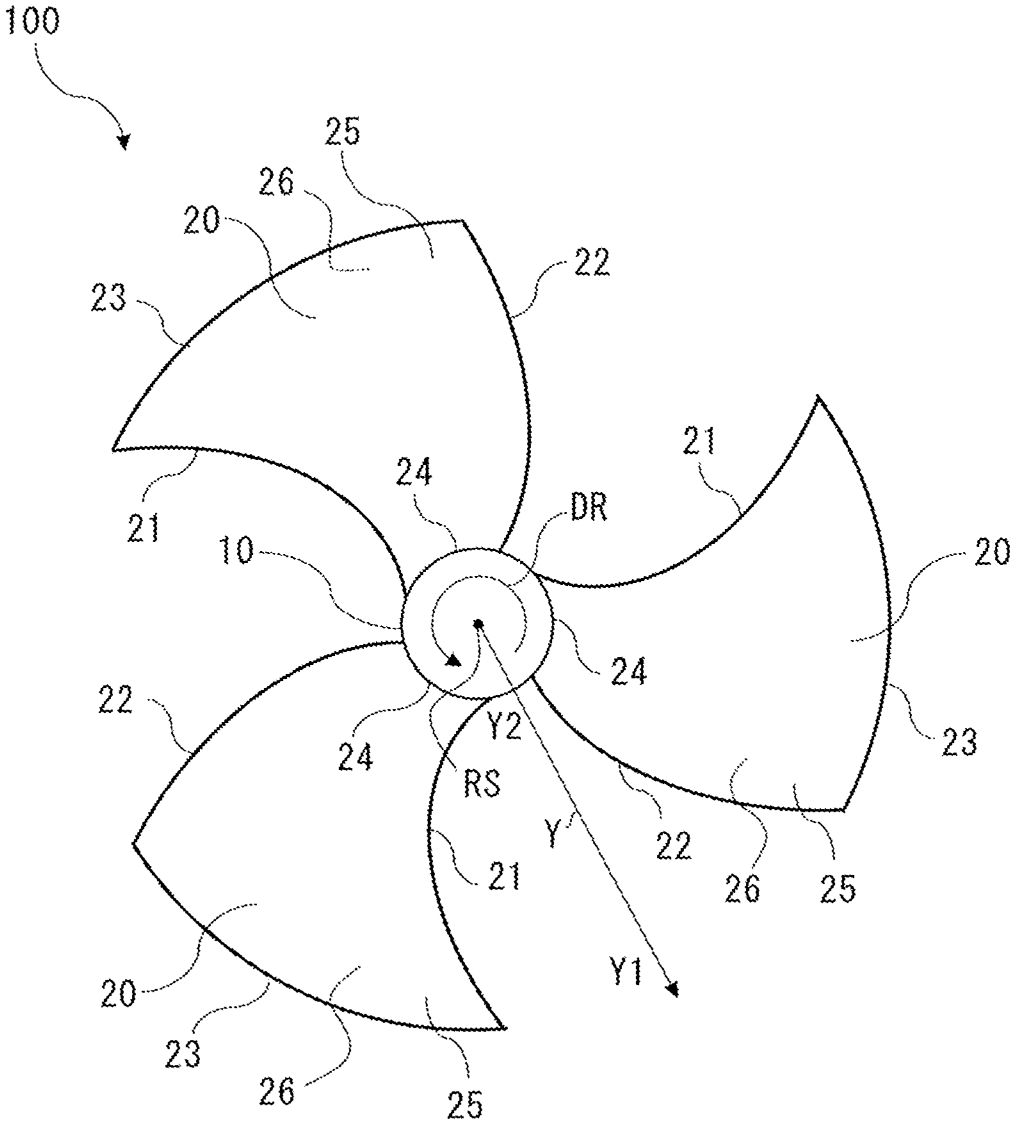
FIG. 1 is a front view schematically showing a configuration of an axial fan according to Embodiment 1.

FIG. 1 is a front view schematically showing a configuration of an axial fan 100 according to Embodiment 1. The direction of rotation DR indicated by an arrow in FIG. 1 shows the direction of rotation DR of the axial fan 100. Further, an upstream side of an airflow across the axial fan 100 is aimed in a direction away from a viewer who looks at FIG. 1, and a downstream side of the airflow across the axial fan 100 is aimed in a direction toward the viewer. An air suction side of the axial fan 100 is situated upstream of the axial fan 100, and an air blowout side of the axial fan 100 is situated downstream of the axial fan 100. Further, the rotation shaft RS is a rotation shaft of the axial fan 100, and the axial fan 100 rotates in the direction of rotation DR about the rotation shaft RS. In FIG. 1, the Y axis represents the direction of the radius of the axial fan 100 from the rotation shaft RS. The axial fan 100 has its inner periphery situated at a Y1 side of the axial fan 100 opposite to a Y2 side of the axial fan 100, and has its outer periphery situated at the Y2 side opposite to the Y1 side.

The axial fan according to Embodiment 1 is described with reference to FIG. 1. The axial fan 100 is used, for example, in an air-conditioning apparatus, a ventilating apparatus, or other apparatuses. As shown in FIG. 1, the axial fan 100 includes a hub 10 provided on the rotation shaft RS and a plurality of blades 20 provided to the hub 10.

(Hub 10)

The hub 10 has the rotation shaft RS and is driven to rotate. The hub 10 rotates about the rotation shaft RS. The direction of rotation DR of the axial fan 100 is a counterclockwise direction indicated by an arrow in FIG. 1. Note, however, that the direction of rotation DR of the axial fan 100 is not limited to a counterclockwise direction. For example, by varying the angle of mounting of the blades 20 or the orientation of the blades 20, the axial fan 100 may be configured to rotate in a clockwise direction. The hub 10 is connected to a rotation shaft of a drive source such as a motor (not illustrated). The hub 10 may be configured in the shape of a cylinder or may be configured in the shape of a plate. The hub 10 is not limited to any particular shape, as long as the hub 10 is connected to the rotation shaft of the drive source as mentioned above.

(Blade 20)

The plurality of blades 20 are configured to radially extend radially outward from the hub 10. The plurality of blades 20 are circumferentially placed at spacings from each other. While Embodiment 1 illustrates a configuration in which three blades 20 are provided, any number of blades 20 may be provided.

Each of the blades 20 has a front edge portion 21, a rear edge portion 22, an outer periphery edge portion 23, and an inner periphery edge portion 24. The front edge portion 21 is placed upstream in an airflow generated, and is furthest forward in the direction of rotation DR in the blade 20. That is, the front edge portion 21 is placed further forward than the rear edge portion 22 in the direction of rotation DR. The rear edge portion 22 is placed downstream in the airflow generated, and is furthest rearward in the direction of rotation DR in the blade 20. That is, the rear edge portion 22 is placed further rearward than the front edge portion 21 in the direction of rotation DR. The axial fan 100 has the front edge portion 21 as a blade tip portion facing forward in the direction of rotation DR of the axial fan 100, and has the rear edge portion 22 as a blade tip portion opposite to the front edge portion 21 in the direction of rotation DR.

The outer periphery edge portion 23 is a portion extending forward and rearward and in an arc to connect an outermost peripheral portion of the front edge portion 21 and an outermost peripheral portion of the rear edge portion 22. The outer periphery edge portion 23 is placed at an end portion of the axial fan 100 in the direction of the radius (i.e., a Y-axis direction). The inner periphery edge portion 24 is a portion extending forward and rearward and in an arc between an innermost peripheral portion of the front edge portion 21 and an innermost peripheral portion of the rear edge portion 22. The blades 20 have their inner periphery edge portions 24 connected to the hub 10.

The blades 20 are at a predetermined angle of inclination from the rotation shaft RS. The blades 20 convey a fluid by pressing gas present between the blades 20 with blade surfaces as the axial fan 100 rotates. A surface of each of these blade surfaces that is subjected to a pressure raised by pressing the fluid serves as a pressure surface 25, and a surface opposite to the pressure surface 25 that is subjected to a pressure drop serves as a suction surface 26. A surface of each of the blades 20 situated upstream (Z1 side) of the blade 20 in the direction in which the airflow flows serves as a suction surface 26, and a surface of each of the blades 20 situated downstream (Z2 side) serves as a pressure surface 25. In FIG. 1, a surface of each of the blades 20 facing toward the viewer serves as a pressure surface 25, and a surface of each of the blades 20 facing away from the viewer serves as a suction surface 26.

Figure 2:
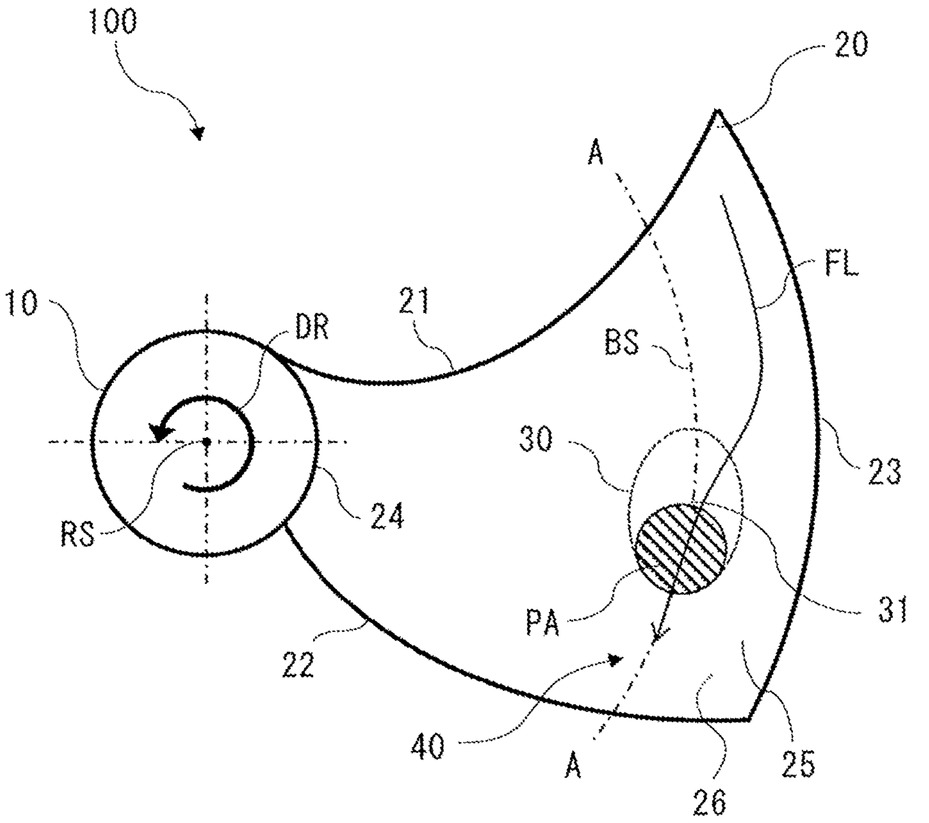
FIG. 2 is a front view schematically showing a configuration of a blade of the axial fan according to Embodiment 1.
Figure 3:
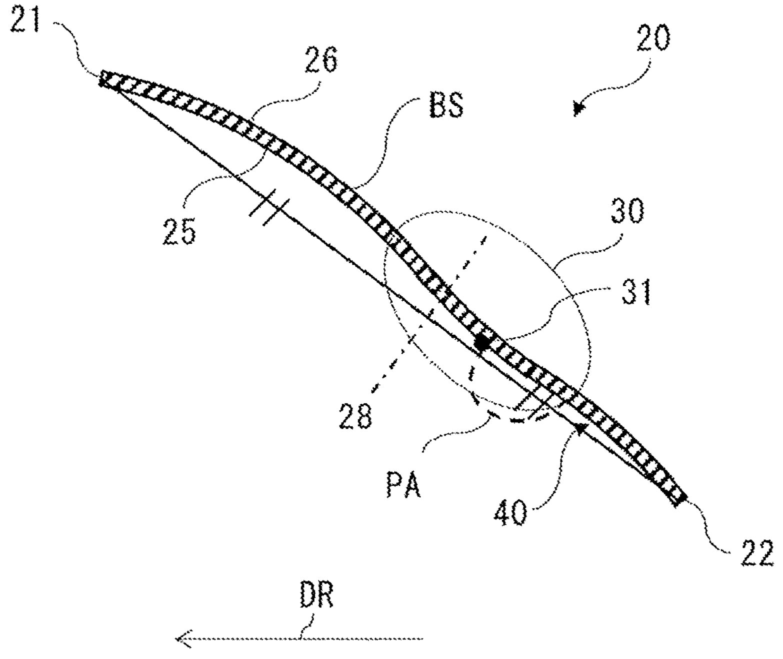
FIG. 3 is a sectional view of the blade as taken along line A-A in FIG. 2.

FIG. 2 is a front view schematically showing a configuration of a blade 20 of the axial fan 100 according to Embodiment 1. FIG. 3 is a sectional view of the blade 20 as taken along line A-A in FIG. 2. The configuration of the blade 20 is described in detail with reference to FIGS. 2 and 3. The section taken along line A-A in FIG. 2 is a blade section BS of a portion in a particular place in the direction of the radius centered at the rotation shaft RS. The blade section BS is a first blade section and, as shown in FIG. 2, is an arcuate sectional portion passing through the front edge portion 21 and the rear edge portion 22 in a plan view of the blade 20 as seen parallel to an axial direction of the rotation shaft RS. The blade section BS, which is a first section, is a section of a portion between the front edge portion 21 and the rear edge portion 22 of the blade 20 along the direction of rotation DR of the blade 20, and is an area that is further inward than is the outer periphery edge portion 23, which is a most radially outer periphery. The blade section BS shown in FIG. 3 is a sectional view of the blade 20 as seen when the blade section BS is radially viewed.

As shown in FIGS. 2 and 3, in the blade section BS, which is an area that is further inward (toward the Y2 side) than the outer periphery edge portion 23, which is the most radially outer periphery of the axial fan 100, the blade 20 has a projection portion 30 projecting from a portion of the pressure surface 25 that is between the front edge portion 21 and the rear edge portion 22 of the blade 20. As shown in FIG. 3, the projection portion 30 is shaped such that a portion of the pressure surface 25 that serves as the projection portion 30 projects and a portion of the suction surface 26 that serves as the projection portion 30 recedes. That is, as shown in FIG. 3, in the blade section BS of the portion between the front edge portion 21 and the rear edge portion 22 of the blade 20, the blade 20 is bent and warped such that the projection portion 30 projects in the direction of rotation DR of the axial fan 100 and downstream in the airflow. The projection portion 30 needs only be shaped such that the portion of the pressure surface 25 that serves as the projection portion 30 projects, and the portion of the suction surface 26 that serves as the projection portion 30 is not limited to any particular shape. For example, in the blade section BS of the portion between the front edge portion 21 and the rear edge portion 22 of the blade 20, the portion of the pressure surface 25 that serves as the projection portion 30 may differ in curvature from the portion of the suction surface 26 that serves as the projection portion 30.

The projection portion 30 has a projection top 31 that is a top of the projection portion 30 and is closer to the rear edge portion 22 than is a center 28 between the front edge portion 21 and the rear edge portion 22 of the blade 20 in the blade section BS of the portion between the front edge portion 21 and the rear edge portion 22 in the direction of rotation DR of the blade 20. The projection top 31 is a portion of the projection portion 30 that projects most. The projection top 31 needs only be a portion of the projection portion 30 that projects most, and the projection top 31 is not limited to any particular shape. For example, the projection top 31 may have a dot shape or may have a line shape formed by a series of dots, that is, a peak shape.

As shown in FIG. 2, the projection portion 30 has a circumferentially long elliptical shape in a plan view as seen parallel to the axial direction of the rotation shaft RS. However, the projection portion 30 is not limited to any particular shape. The projection portion 30 may have, for example, a radially long elliptical shape or a circular shape, as long as the shape does not produce the separation of the airflow from the pressure surface 25.

The blade 20 has one projection portion 30 or may have a plurality of projection portions 30 provided in the direction of the radius of the axial fan 100. It should be noted that no projection portion 30 is provided at the outer periphery edge portion 23.

In the blade section BS of the portion between the front edge portion 21 and the rear edge portion 22 of the blade 20 in which the projection portion 30 is provided, the blade 20 has a rear edge recess portion 40 receding from a portion of the pressure surface 25 that is between the projection portion 30 and the rear edge portion 22. The rear edge recess portion 40 is a first recess portion of the blade 20, and is provided behind the projection portion 30 in the direction of rotation DR. The rear edge recess portion 40 may be provided without interruption from the projection portion 30 in the direction of rotation DR or may be provided with interruption from the projection portion 30 by providing another component such as a flat portion and a corrugated portion between the projection portion 30 and the rear edge recess portion 40.

As shown in FIG. 3, the rear edge recess portion 40 is shaped such that a portion of the pressure surface 25 that serves as the rear edge recess portion 40 recedes and a portion of the suction surface 26 that serves as the rear edge recess portion 40 projects. That is, as shown in FIG. 3, in the blade section BS of the portion between the front edge portion 21 and the rear edge portion 22 of the blade 20, the blade 20 is bent and warped such that the rear edge recess portion 40 projects in a direction opposite to the direction of rotation DR of the axial fan 100 and upstream in the airflow. The rear edge recess portion 40 needs only be shaped such that the portion of the pressure surface 25 that serves as the rear edge recess portion 40 recedes, and the portion of the suction surface 26 that serves as the rear edge recess portion 40 is not limited to any particular shape. For example, in the blade section BS of the portion between the front edge portion 21 and the rear edge portion 22 of the blade 20, the portion of the pressure surface 25 that serves as the rear edge recess portion 40 may differ in curvature from the portion of the suction surface 26 that serves as the rear edge recess portion 40.

Figure 4:
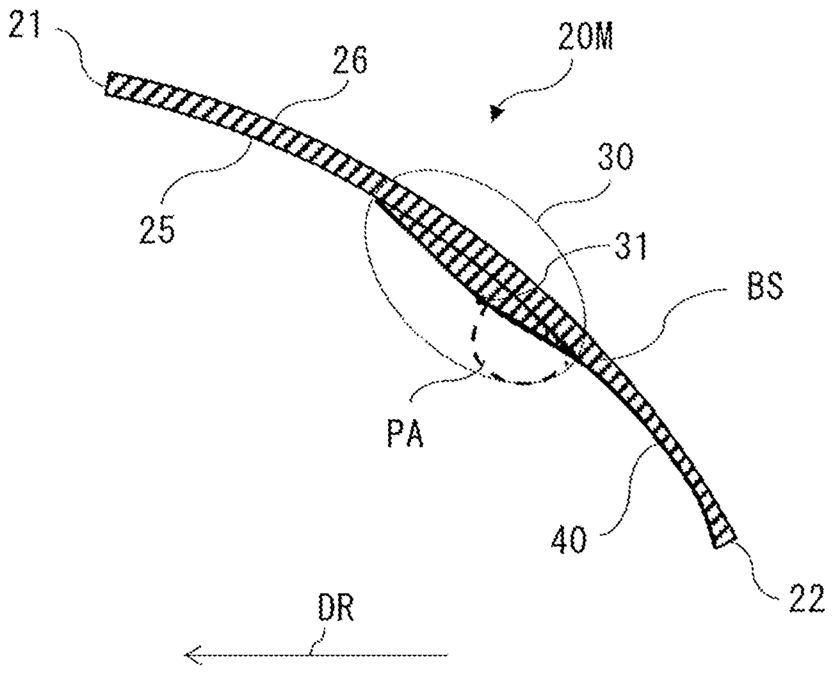
FIG. 4 is a sectional view of a blade of a modification of the axial fan according to Embodiment 1.

FIG. 4 is a sectional view of a blade 20M of a modification of the axial fan 100 according to Embodiment 1. The sectional view of the blade 20M is a sectional view of a portion between the front edge portion 21 and the rear edge portion 22 in the direction of rotation DR, and is a sectional view taken along line A-A in FIG. 2. As mentioned above, the projection portion 30 needs only be shaped such that the portion of the pressure surface 25 that serves as the projection portion 30 projects, and the suction surface 26 is not limited to any particular shape. The blade 20M does not have its projection portion 30 formed by bending the blade plate as in the case of the blade 20 but has its projection portion 30 formed by adjusting the blade thickness. The blade 20M has its projection portion 30 shaped such that the portion of the pressure surface 25 that serves as the projection portion 30 extends and the blade thickness of the projection portion 30 is greater than the blade thickness of a portion of the blade 20M that is closer to the front edge portion 21 than is the projection portion 30. That is, by having its projection portion 30 shaped such that the portion of the pressure surface 25 that serves as the projection portion 30 projects, the blade 20M is shaped such that the projection portion 30 is thicker than a projection portion of a blade having a uniform blade thickness.

Further, as mentioned above, the rear edge recess portion 40 needs only be shaped such that the portion of the pressure surface 25 that serves as the rear edge recess portion 40 recedes, and the portion of the suction surface 26 that serves as the rear edge recess portion 40 is not limited to any particular shape. The blade 20M may not have its rear edge recess portion 40 formed by bending the blade plate as in the case of the blade 20 but may have its rear edge recess portion 40 formed by adjusting the blade thickness. The blade 20M may be shaped such that the portion of the pressure surface 25 that serves as the rear edge recess portion 40 recedes toward the portion of the suction surface 26 that serves as the rear edge recess portion 40 and the blade thickness of the rear edge recess portion 40 is smaller than the blade thickness of a portion of the blade 20M that is closer to the front edge portion 21 than is the projection portion 30. That is, by having its rear edge recess portion 40 shaped such that the portion of the pressure surface 25 that serves as the rear edge recess portion 40 recedes toward the portion of the suction surface 26 that serves as the rear edge recess portion 40, the blade 20M may be shaped such that the rear edge recess portion 40 is thinner than a rear edge recess portion of a blade having a uniform blade thickness.

[Operation of Axial Fan 100]

When the axial fan 100 rotates in the direction of rotation DR shown in FIG. 1, each blade 20 presses ambient air with the pressure surface 25. This causes a flow to move in a direction orthogonal to the surface of paper on which FIG. 1 is drawn. More specifically, the rotation of the axial fan 100 in the direction of rotation DR shown in FIG. 1 generates an airflow that moves in a direction from a far side to a near side of the surface of paper on which FIG. 1 is drawn. Further, the rotation of the axial fan 100 produces a pressure difference between the pressure of the pressure surface 25 and the pressure of the suction surface 26 in an area around each blade 20. Specifically, the suction surface 26 is subjected to a lower pressure than is the pressure surface 25.

[Effects of Axial Fan 100]

Figure 5:
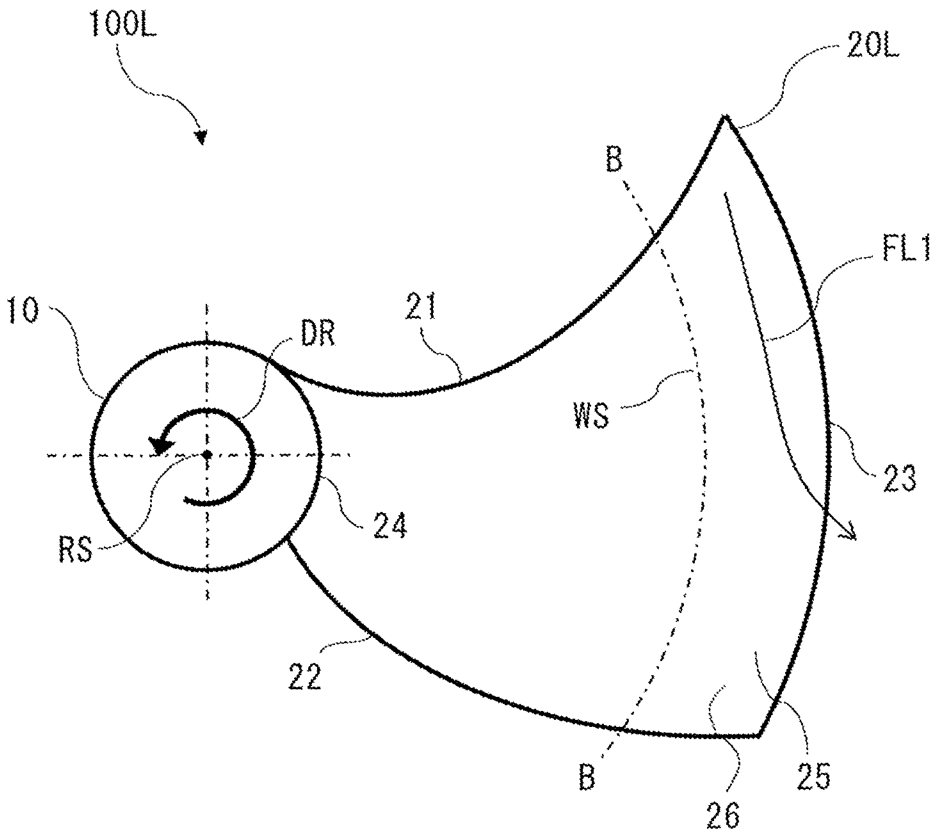
FIG. 5 is a front view schematically showing a configuration of a blade of an axial fan according to a comparative example.
Figure 6:
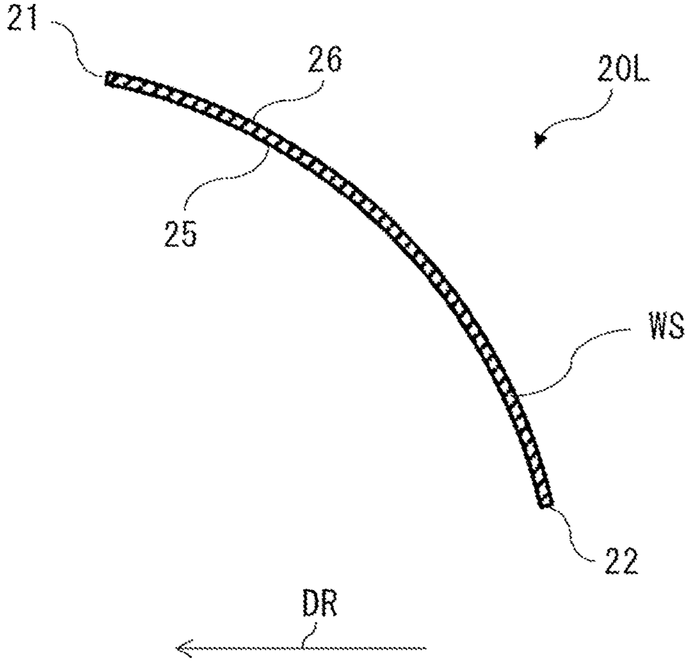
FIG. 6 is a sectional view of the blade as taken along line B-B in FIG. 5.

FIG. 5 is a front view schematically showing a configuration of a blade 20L of an axial fan 100L according to a comparative example. FIG. 6 is a sectional view of the blade 20L as taken along line B-B in FIG. 5. The B-B section shown in FIG. 6 is a section of the blade 20 along an arc passing through the front edge portion 21 and the rear edge portion 22 in a particular place in the direction of the radius centered at the rotation shaft RS. The section taken along line B-B in FIG. 5 is a blade section WS of a portion in a particular place in the direction of the radius centered at the rotation shaft RS. As shown in FIG. 5, the blade section WS is an arcuate sectional portion passing through the front edge portion 21 and the rear edge portion 22 in a plan view of the blade 20L as seen parallel to an axial direction of the rotation shaft RS. The blade section WS shown in FIG. 6 is a sectional view of the blade 20L as seen when the blade section WS is radially viewed.

The axial fan 100L according to the comparative example has the blade 20L. As shown in FIG. 6, the blade 20L is shaped such that the pressure surface 25 recedes and the suction surface 26 projects, That is, the blade 20L is bent and warped such that in any place in the direction of the radius, the whole blade projects in a direction opposite to the direction of rotation DR of the axial fan 100 and upstream in the airflow.

In a blade section WS without a projection portion projecting from the pressure surface 25 as in the case of the blade 20L of the comparative example, a contribution of output from the axial fan 100L increases on the outer periphery of the axial fan 100L as a unit to which the axial fan 100L is mounted is configured to produce a higher pressure loss. Moreover, when the contribution of the output from the axial fan 100L increases on the outer periphery of the axial fan 100L, there is an increase in flow of gas toward a radially outer periphery of the axial fan 100L. Therefore, as shown in FIG. 5, the axial fan 100L generates a flow of gas of a radial component from the inner periphery toward the outer periphery. As a result, as shown in FIG. 5, the axial fan 100L causes a flow of gas FL1 to leak from the pressure surface 25 of the blade 20 toward the suction surface 26 at the outer periphery edge portion 23. Moreover, the axial fan 100L induces the growth of a blade tip vortex, as the flow of gas FL1 leaks from the pressure surface 25 of the blade 20 toward the suction surface 26 at the outer periphery edge portion 23. The clause "a unit is configured to produce a higher pressure loss" refers, for example, to a case in which a heat exchanger disposed in the unit is configured such that a gap through which an airflow generated by the axial fan 100L passes is narrower than a gap of some heat exchanger.

On the other hand, as shown in FIGS. 2 and 3, the axial fan 100 according to Embodiment 1 is configured such that each of the blades 20 has a projection portion 30 and the projection portion 30 provides the blade 20 with an area projecting from the pressure surface 25. Therefore, as the speed of a flow of gas in the projection portion 30 increases on the pressure surface 25 of the blade 20, the axial fan 100 produces, behind the projection top 31 in the direction of rotation DR, a reduced-pressure area PA in which a pressure is reduced. On the pressure surface 25, the pressure in this reduced-pressure area PA is lower than a pressure on a periphery that is further radially outward than is the projection portion 30.

The axial fan 100 has its projection portion 30 provided in an area that is further inward than the most radially outer periphery of the axial fan 100. The axial fan 100 generates a gas flow of a radial component toward the inner periphery through a pressure difference on the pressure surface 25 of the blade 20 between the pressure in the reduced-pressure area PA and the pressure on the periphery that is further radially outward than is the projection portion 30. Therefore, as shown in FIG. 2, the axial fan 100 generates, on the pressure surface 25 of the blade 20, a flow of gas FL that moves from the periphery that is radially outward than is the projection portion 30 toward the reduced-pressure area PA and a flow of gas FL that moves from the radially outer periphery toward the inner periphery of the axial fan 100. As a result, the axial fan 100 can reduce leakage of gas flowing from the pressure surface 25 toward the suction surface 26 at the outer periphery edge portion 23, and can inhibit the growth of a blade tip vortex. Further, the axial fan 100 can attain a higher static pressure by reducing the leakage of gas flowing from the pressure surface 25 toward the suction surface 26 at the outer periphery edge portion 23. Moreover, as the axial fan 100 can attain a higher static pressure, the axial fan 100 can reduce fan input by bringing about improvement in fan efficiency. Further, as the axial fan 100 can ensure the required volume of air at a lower rotation frequency, the axial fan 100 can reduce noise.

Further, the axial fan 100 of the comparative example suffers from a greater leakage of gas, as the leakage of gas flowing from the pressure surface 25 toward the suction surface 26 at the outer periphery edge portion 23 is comparatively small at a portion of the outer periphery edge portion 23 close to the front edge portion 21 and the pressure of gas on the pressure surface 25 increases toward the rear edge portion 22.

The axial fan 100 according to Embodiment 1 is configured such that the projection portion 30 has a projection top 31 that is a top of the projection portion 30 and is closer to the rear edge portion 22 than is a center 28 between the front edge portion 21 and the rear edge portion 22 of the blade 20 in the blade section BS. Therefore, the axial fan 100 can generate a flow of gas FL of a radial component from the outer periphery toward the inner periphery in a place at the outer periphery edge portion 23 in which the leakage of gas increases. As a result, the axial fan 100 can reduce leakage of gas flowing from the pressure surface 25 toward the suction surface 26 at the outer periphery edge portion 23.

Further, in the blade section BS of the portion between the front edge portion 21 and the rear edge portion 22 of the blade 20 in which the projection portion 30 is provided, the blade 20 of the axial fan 100 according to Embodiment 1 has a rear edge recess portion 40 receding from a portion of the pressure surface 25 that is between the projection portion 30 and the rear edge portion 22. In a case in which the projection portion 30 is provided on the pressure surface 25 of the axial fan 100, providing the projection portion 30 at the rear edge portion 22 brings the rear edge portion 22 of the blade 20 into a state in which the blade 20 lies down, with the result that there is a decrease in volume of air that is output. The state in which the blade 20 lies down refers to a state in which the blade 20 is close to being parallel to the direction of rotation DR. In the blade section BS, the blade 20 of the axial fan 100 according to Embodiment 1 has a rear edge recess portion 40 receding from a portion of the pressure surface 25 that is between the projection portion 30 and the rear edge portion 22. This brings the axial fan 100 into a state in which the blade 20 stands at the rear edge portion 22, thus making it possible to inhibit the decrease in volume of air that is output. The state in which the blade 20 stands refers to a state in which the blade 20 is at an angle from the direction of rotation DR.

Embodiment 2

[Axial Fan 100A]

Figure 7:
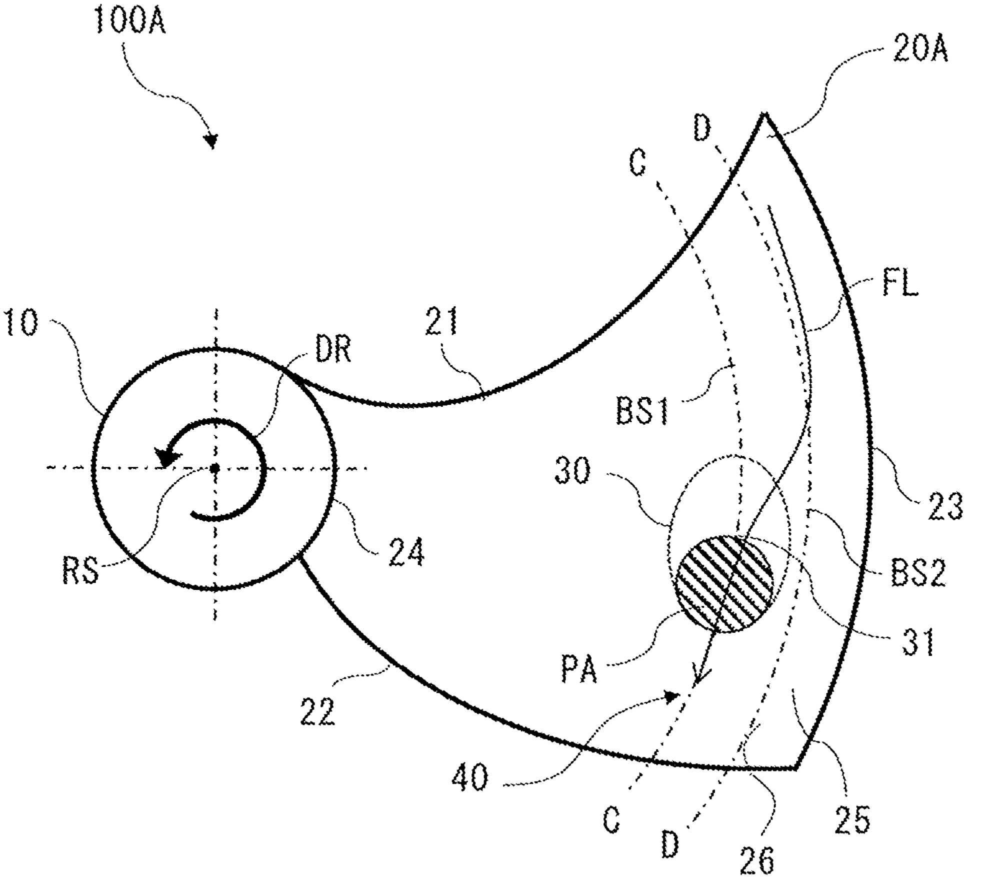
FIG. 7 is a front view schematically showing a configuration of a blade of an axial fan according to Embodiment 2.
Figure 8:
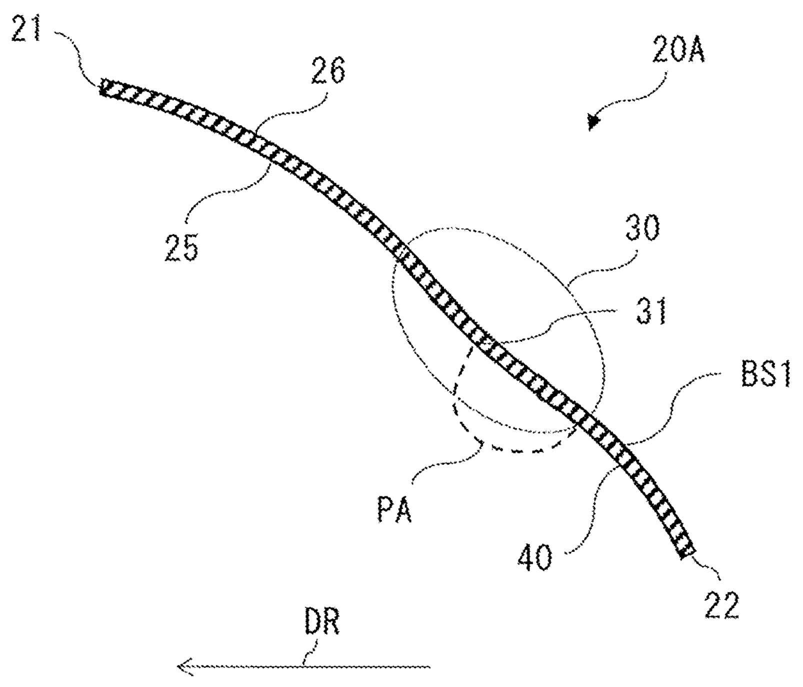
FIG. 8 is a sectional view of the blade as taken along line C-C in FIG. 7.
Figure 9:
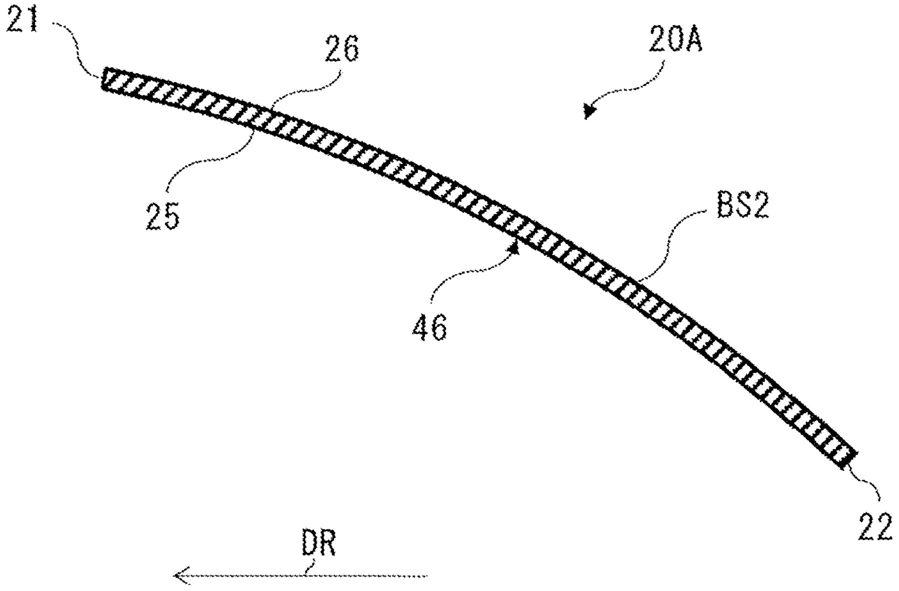
FIG. 9 is a sectional view of the blade as taken along line D-D in FIG. 7.

FIG. 7 is a front view schematically showing a configuration of a blade 20A of an axial fan 100A according to Embodiment 2. FIG. 8 is a sectional view of the blade 20A as taken along line C-C in FIG. 7. FIG. 9 is a sectional view of the blade 20A as taken along line D-D in FIG. 7, The configuration of the blade 20A is described in detail with reference to FIGS. 7 to 9. Components identical to those of the axial fan 100 of FIGS. 1 to 6 are given identical reference signs, and a description of such components is omitted. The section taken along line C-C in FIG. 7 is a blade section BS1 of a portion in a particular place in the direction of the radius centered at the rotation shaft RS. Further, the section taken along line D-D in FIG. 7 is a blade section BS2 of a portion in a particular place in the direction of the radius centered at the rotation shaft RS. As shown in FIG. 7, the blade section BS1 and the blade section BS2 are arcuate sectional portions passing through the front edge portion 21 and the rear edge portion 22 in a plan view of the blade 20A as seen parallel to an axial direction of the rotation shaft RS. Further, the blade section BS2 is closer to the outer periphery than is the blade section BS1, and the blade section BS1 is closer to the inner periphery than is the blade section BS2. The blade section BS1 shown in FIG. 8 and the blade section BS2 shown in FIG. 9 are sectional views of the blade 20A as seen when the blade section BS1 and the blade section BS2 are radially viewed.

The blade section BS1 of the blade 20A of the axial fan 100A is a first blade section, and is the same in configuration as the blade section BS of the blade 20 of the axial fan 100. Accordingly, the blade section BS1, which is a first section, is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20A of the axial fan 100A has a projection portion 30, a projection top 31, and a rear edge recess portion 40 in the blade section BS1. The axial fan 100A is intended to further specify the configuration of a portion between the blade section BS1 and the outer periphery edge portion 23.

The blade 20A of the axial fan 100A has the blade section BS2, which is a second blade section that is further outward than is the projection portion 30 in the direction of the radius of the axial fan 100A. The blade section BS2, which is the second blade section, is further radially outward than is the projection portion 30, is a section of a portion between the front edge portion 21 and the rear edge portion 22 of the blade 20 along the direction of rotation DR of the blade 20, and is an area that is further inward than is the outer periphery edge portion 23. The blade section BS2, which is the second blade section of the blade 20A, has an outer periphery recess portion 46 shaped such that in the direction of rotation DR, a portion of the pressure surface 25 that serves as the outer periphery recess portion 46 recedes in all of the blade 20 that is between the front edge portion 21 and the rear edge portion 22. As shown in FIG. 9, the outer periphery recess portion 46 is shaped such that a portion of the pressure surface 25 that serves as the outer periphery recess portion 46 recedes and a portion of the suction surface 26 that serves as the outer periphery recess portion 46 projects. In the blade section BS2 of the portion between the front edge portion 21 and the rear edge portion 22 of the blade 20A in the direction of rotation DR, the blade 20A is bent and warped into an arc such that a blade plate that is the outer periphery recess portion 46 projects in a direction opposite to the direction of rotation DR of the axial fan 100 and upstream in the airflow. The outer periphery recess portion 46 needs only be shaped such that the portion of the pressure surface 25 that serves as the outer periphery recess portion 46 recedes, and the portion of the suction surface 26 that serves as the outer periphery recess portion 46 is not limited to any particular shape. For example, in the blade section BS2 of the portion between the front edge portion 21 and the rear edge portion 22 of the blade 20A, the portion of the pressure surface 25 that serves as the outer periphery recess portion 46 may differ in curvature from the portion of the suction surface 26 that serves as the outer periphery recess portion 46.

[Effects of Axial Fan 100A]

The blade section BS2, which is the second blade section of the blade 20A, has an outer periphery recess portion 46 shaped such that in the direction of rotation DR, the pressure surface 25 recedes in all of the blade 20 that is between the front edge portion 21 and the rear edge portion 22. As the outer periphery recess portion 46 can ensure a higher pressure than does the reduced-pressure area PA placed further inward than is the outer periphery recess portion 46 and formed by the projection portion 30 projecting from the pressure surface 25, the axial fan 100A can increase the flow of a radial component of gas moving from the outer periphery toward the inner periphery because of the pressure difference. Therefore, the axial fan 100A can reduce leakage of gas flowing from the pressure surface 25 toward the suction surface 26 at the outer periphery edge portion 23, and can inhibit the growth of a blade tip vortex. Further, the axial fan 100A can attain a higher static pressure by reducing the leakage of gas flowing from the pressure surface 25 toward the suction surface 26 at the outer periphery edge portion 23. Moreover, as the axial fan 100A can attain a higher static pressure, the axial fan 100A can reduce fan input by bringing about improvement in fan efficiency. Further, as the axial fan 100A can ensure the required volume of air at a lower rotation frequency, the axial fan 100A can reduce noise.

Further, the outer periphery recess portion 46 is bent and warped into an arc such that the blade plate projects in a direction opposite to the direction of rotation DR and upstream in the airflow generated by the rotation of the blade 20. As this configuration allows the outer periphery recess portion 46 to ensure a higher pressure than does the reduced-pressure area PA placed further inward than is the outer periphery recess portion 46 and formed by the projection portion 30 projecting from the pressure surface 25, the axial fan 100A can increase the flow of a radial component of gas moving from the outer periphery toward the inner periphery because of the pressure difference. Therefore, the axial fan 100A can reduce leakage of gas flowing from the pressure surface 25 toward the suction surface 26 at the outer periphery edge portion 23. Further, the axial fan 100A can attain a higher static pressure by reducing the leakage of gas flowing from the pressure surface 25 toward the suction surface 26 at the outer periphery edge portion 23. Moreover, as the axial fan 100A can attain a higher static pressure, the axial fan 100A can reduce fan input by bringing about improvement in fan efficiency. Further, as the axial fan 100A can ensure the required volume of air at a lower rotation frequency, the axial fan 100A can reduce noise.

Embodiment 3

[Axial Fan 100B]

Figure 10:
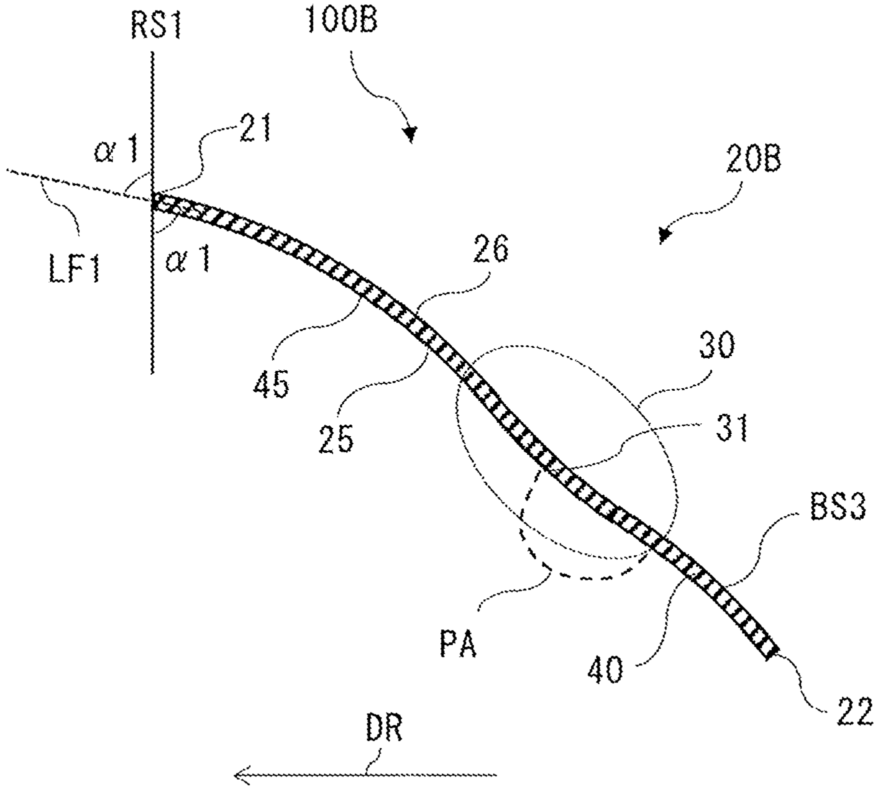
FIG. 10 is a sectional view of a blade of an axial fan according to Embodiment 3.

FIG. 10 is a sectional view of a blade 20B of an axial fan 100B according to Embodiment 3. The sectional view of the blade 20B is a sectional view of the blade section BS taken along line A-A in FIG. 1 or the blade section BS1 taken along line C-C in FIG. 7. The configuration of the blade 20B is described in detail with reference to FIG. 10. Components identical to those of the axial fans 100 and 100A of FIGS. 1 to 9 are given identical reference signs, and a description of such components is omitted.

A blade section BS3 of the blade 20B of the axial fan 100B is a first blade section, and is the same in configuration as the blade section BS of the blade 20 of the axial fan 100. Accordingly, the blade section BS3, which is a first section, is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20B of the axial fan 100B has a projection portion 30, a projection top 31, and a rear edge recess portion 40 in the blade section BS3. The axial fan 100B is intended to further specify the configuration of a portion between the projection portion 30 and the front edge portion 21 in the blade section BS3.

In the blade section BS of the portion of the front edge portion 21 and the rear edge portion 22 of the blade 20B in which the projection portion 30 is provided, the blade 20B has a front edge recess portion 45 receding from a portion of the pressure surface 25 that is between the projection portion 30 and the front edge portion 21. The front edge recess portion 45 is a second recess portion, and is provided further forward than is the projection portion 30 in the direction of rotation DR. The front edge recess portion 45 may be provided without interruption from the projection portion 30 in the direction of rotation DR or may be provided with interruption from the projection portion 30 by providing another component such as a flat portion and a corrugated portion between the projection portion 30 and the front edge recess portion 45.

As shown in FIG. 10, the front edge recess portion 45, which is the second recess portion, is shaped such that a portion of the pressure surface 25 that serves as the front edge recess portion 45 recedes and a portion of the suction surface 26 that serves as the front edge recess portion 45 projects. That is, as shown in FIG. 10, the blade 20B is bent and warped such that the front edge recess portion 45 projects in a direction opposite to the direction of rotation DR of the axial fan 166E and upstream in the airflow in the blade section BS3 of the portion between the front edge portion 21 and the rear edge portion 22 of the blade 20B. The front edge recess portion 45 needs only be shaped such that the portion of the pressure surface 25 that serves as the front edge recess portion 45 recedes, and the portion of the suction surface 26 that serves as the front edge recess portion 45 is not limited to any particular shape. For example, in the blade section BS3 of the portion between the front edge portion 21 and the rear edge portion 22 of the blade 20B, the portion of the pressure surface 25 that serves as the front edge recess portion 45 may differ in curvature from the portion of the suction surface 26 that serves as the front edge recess portion 45.

Further, the blade 20B may not have its front edge recess portion 45 formed by bending the blade plate but may have its front edge recess portion 45 formed by adjusting the blade thickness. That is, by having its front edge recess portion 45 shaped such that the portion of the pressure surface 25 that serves as the front edge recess portion 45 recedes toward the suction surface 26, the blade 20B may be shaped such that the front edge recess portion 45 is thinner than a front edge recess portion of a blade having a uniform blade thickness.

Further, it is desirable that by having the front edge recess portion 45, the blade 20B be shaped such that a center line LF1 of the blade 20B passing through the front edge portion 21 comes close to the direction of rotation DR, that is, such that an inlet angle α1 increases, As shown in FIG. 10, in the blade section BS3 of the blade 20B, the inlet angle α1 of the blade 20 is defined as an angle formed by a straight line RS1 parallel to the rotation shaft RS passing through the front edge portion 21 of the blade 20B and the center line LF1 of the blade 20B passing through the front edge portion 21. In the blade section BS3 of the blade 20B, the inlet angle α1 is an angle between the straight line RS1 and the center line LF1, and is an angle that is further upstream in the airflow than the center line LF1 and further forward than the straight line RS1 in the direction of rotation DR. Alternatively, in the blade section BS3 of the blade 20B, the inlet angle α1 is an angle between the straight line RS1 and the center line LF1, and is an angle that is further downstream in the airflow than the center line LF1 and further backward than the straight line RS1 in the direction of rotation DR. It is desirable that the inlet angle α1 be greater than 45 degrees and less than 90 degrees (45 degrees<α1<90 degrees), although the inlet angle α1 varies with various conditions such as a pressure loss of a unit. It is further desirable that the inlet angle α1 be greater than or equal to 60 degrees and less than 90 degrees (60 degrees≤α1<90 degrees), although the inlet angle α1 varies with various conditions such as a pressure loss of a unit.

[Effects of Axial Fan 100B]

As a unit to which the axial fan 100B is mounted is configured to produce a higher pressure loss, the angle of gas flowing into the front edge portion 21 from the rotation shaft RS as positional reference becomes a higher angle in a field of relative velocity of a rotating blade 20 of the axial fan 100B and gas moving toward the blade 20. The term "high angle" refers to an angle perpendicular to the rotation shaft RS. As the blade 20B of the axial fan 100B has the front edge recess portion 45, the inlet angle α1 of the front edge portion 21 comes close to the direction of rotation DR. Therefore, the angle (inlet angle α1) of the front edge portion 21 of the blade 20B from the rotation shaft RS as positional reference becomes a high angle, so that the axial fan 100B allows gas to flow along the blade 20.

Embodiment 4

[Axial Fan 100C]

Figure 11:
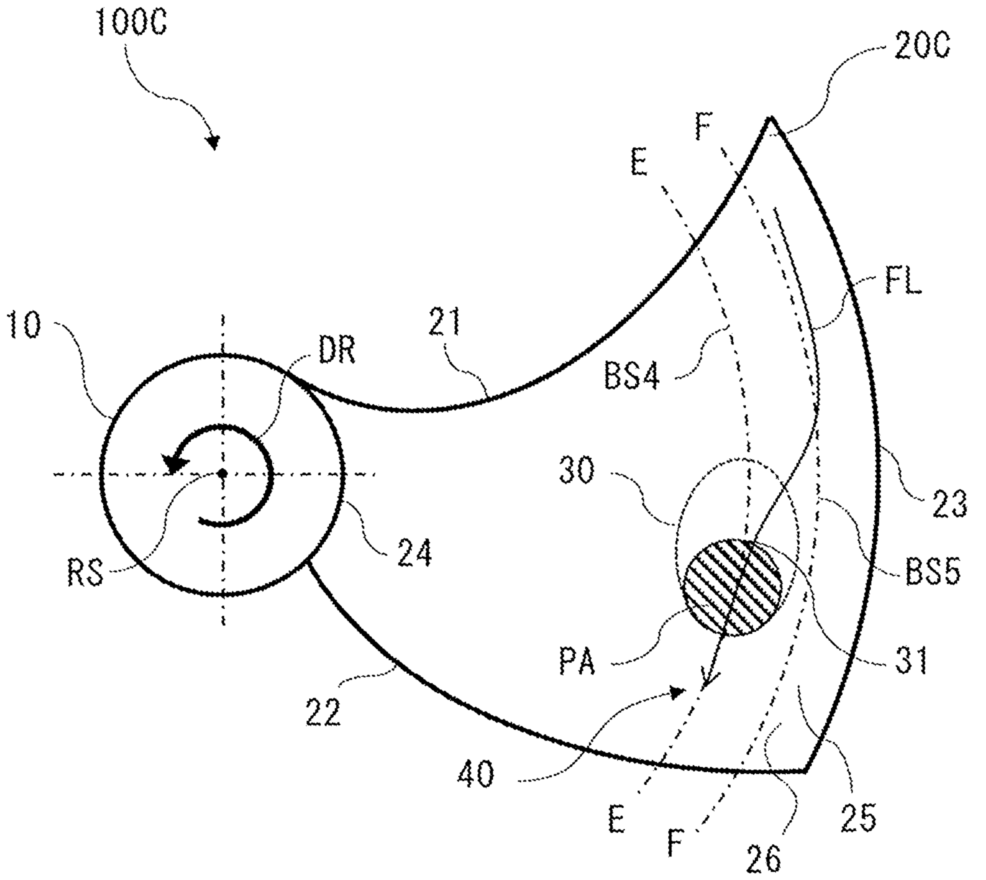
FIG. 11 is a front view schematically showing a configuration of a blade of an axial fan according to Embodiment 4.
Figure 12:
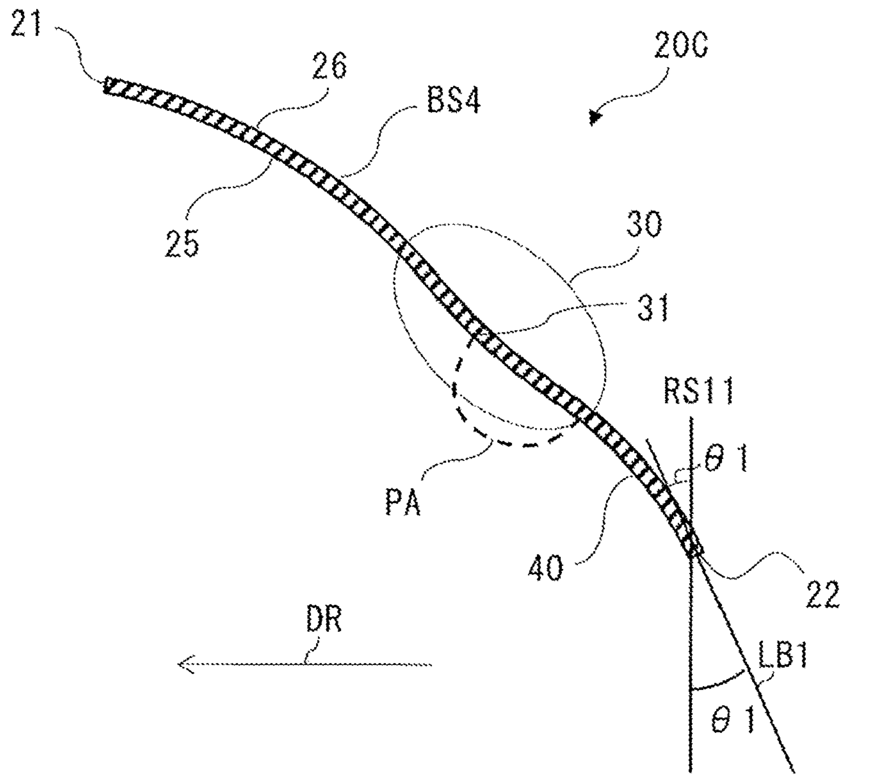
FIG. 12 is a sectional view of the blade as taken along line E-E in FIG. 11.
Figure 13:
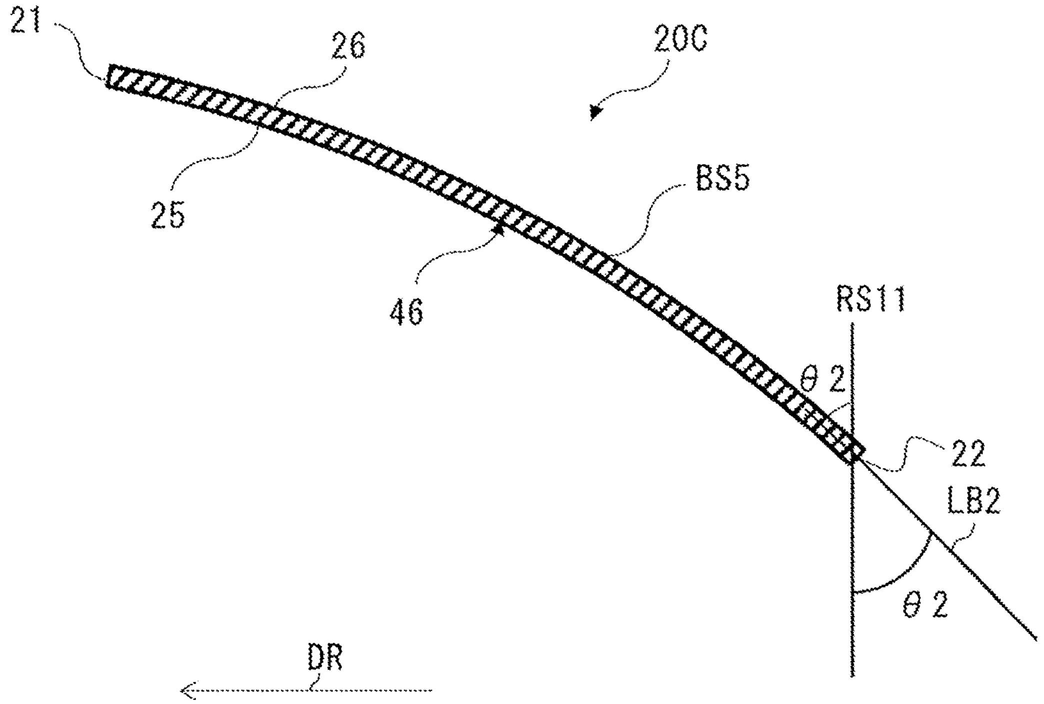
FIG. 13 is a sectional view of the blade as taken along line F-F in FIG. 11.

FIG. 11 is a front view schematically showing a configuration of a blade 20C of an axial fan 100C according to Embodiment 4, FIG. 12 is a sectional view of the blade 20C as taken along line E-E in FIG. 11. FIG. 13 is a sectional view of the blade 20C as taken along line F-F in FIG. 11. The configuration of the blade 20C is described in detail with reference to FIGS. 11 to 13. Components identical to those of the axial fan 100 or other axial fans of FIGS. 1 to 10 are given identical reference signs, and a description of such components is omitted, The E-E section shown in FIG. 12 is a blade section BS4 of a portion in a particular place in the direction of the radius centered at the rotation shaft RS, Further, the F-F section shown in FIG. 13 is a blade section BS5 of a portion in a particular place in the direction of the radius centered at the rotation shaft RS. As shown in FIG. 11, the blade section BS4 and the blade section BS5 are arcuate sectional portions passing through the front edge portion 21 and the rear edge portion 22 in a plan view of the blade 20C as seen parallel to an axial direction of the rotation shaft RS. Further, the blade section BS5 is closer to the outer periphery than is the blade section BS4, and the blade section BS4 is closer to the inner periphery than is the blade section BS5. The blade section BS4 shown in FIG. 12 and the blade section BS5 shown in FIG. 13 are sectional views of the blade 20C as seen when the blade section BS4 and the blade section BS5 are radially viewed.

The blade section BS4 of the blade 20C of the axial fan 100C is a first blade section, and is the same in configuration as the blade section BS of the blade 20 of the axial fan 100. Accordingly, the blade section BS4, which is a first section, is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20C of the axial fan 100C has a projection portion 30, a projection top 31, and a rear edge recess portion 40 in the blade section BS4.

The blade 20C of the axial fan 100C has the blade section BS5, which is a second blade section that is further outward than is the projection portion 30 in the direction of the radius of the axial fan 100C. The blade section BS5, which is the second blade section, is a section of a portion between the front edge portion 21 and the rear edge portion 22 of the blade 20 along the direction of rotation DR of the blade 20, and is an area that is further inward than is the outer periphery edge portion 23, which is the most radially outer periphery. The blade section BS5, which is the second blade section of the blade 20C, has an outer periphery recess portion 46 shaped such that in the direction of rotation DR, the portion of the pressure surface 25 that serves as the outer periphery recess portion 46 recedes in all of the blade 20 that is between the front edge portion 21 and the rear edge portion 22. The axial fan 100C is intended to further specify the configuration of a portion of the rear edge portion 22 in the blade section BS4 and a portion of the rear edge portion 22 in the blade section BS5.

Note here that an outlet angle representing the orientation of a portion of the rear edge portion 22 of the blade 20 placed further rearward than is the projection portion 30 in the direction of rotation DR is defined as a first outlet angle θ1. Further, an outlet angle representing the orientation of a portion of the rear edge portion 22 of the blade 20 that is further outward than is the projection portion 30 in the direction of the radius of the axial fan 100C is defined as a second outlet angle θ2.

As shown in FIG. 12, in the blade section BS4 of the blade 20C having the projection portion 30, the first outlet angle θ1 is defined as an angle formed by a straight line RS11 parallel to the rotation shaft RS passing through the rear edge portion 22 of the blade 20C and a center line LB1 of the blade 20 passing through the rear edge portion 22. In the blade section BS4 of the blade 20C, the first outlet angle θ1 is an angle between the straight line RS11 and the center line LB1, and is an angle that is further downstream in the airflow than the center line LB1 and further backward than the straight line RS11 in the direction of rotation DR. Alternatively, in the blade section BS4 of the blade 20B, the first outlet angle θ1 is an angle between the straight line RS11 and the center line LB1, and is an angle that is further upstream in the airflow than the center line LB1 and further forward than the straight line RS11 in the direction of rotation DR.

As shown in FIG. 13, in the blade section BS5, the second outlet angle θ2 is defined as an angle formed by a straight line RS11 parallel to the rotation shaft RS passing through the rear edge portion 22 of the blade 20C and a center line LB2 of the blade 20 passing through the rear edge portion 22. In the blade section BS5 of the blade 20C, the second outlet angle θ2 is an angle between the straight line RS11 and the center line LB2, and is an angle that is further downstream in the airflow than the center line LB2 and further backward than the straight line RS11 in the direction of rotation DR. Alternatively, in the blade section BS4 of the blade 20B, the first outlet angle θ1 is an angle between the straight line RS11 and the center line LB2, and is an angle that is further upstream in the airflow than the center line LB2 and further forward than the straight line RS11 in the direction of rotation DR.

The blade 20C of the axial fan 100C is shaped such that the second outlet angle θ2 of the blade section BS5, which is the second blade section, is larger than the first outlet angle θ1 of the blade section BS4, which is the first blade section. That is, the blade 20C of the axial fan 100C is shaped such that the first outlet angle θ1 of the blade section BS4, which is the first blade section, is smaller than the second outlet angle θ2 of the blade section BS5, which is the second blade section. The blade 20C of the axial fan 100C is shaped to satisfy the relationship "First Outlet Angle θ1<Second Outlet Angle θ2".

[Effects of Axial Fan 100C]

In general, when an axial fan includes a blade having a rear edge portion whose outlet angle θ is small, the blade stands in a section of a portion of the blade in the rear edge portion, so that the axial fan can increase the volume of air during rotation. Moreover, when there is a great difference in volume of air in the direction of the radius of the blade, the axial fan generates a radial flow of air toward an area with a great volume of air. The blade 20C of the axial fan 100C is configured such that the first outlet angle θ1 is smaller than the second outlet angle θ2. By being configured such that the first outlet angle θ1 is smaller than the second outlet angle θ2, the blade 20C of the axial fan 100C can ensure a sufficient volume of air in a radial area on the pressure surface 25 in which the projection portion 30 is provided. Therefore, the axial fan 100C can generate more flows of gas of a radial component from the outer periphery toward the inner periphery than in a case in which the blade 20 is configured such that the first outlet angle θ1 and the second outlet angle θ2 are equal to each other.

Embodiment 5

[Axial Fan 100D]

Figure 14:
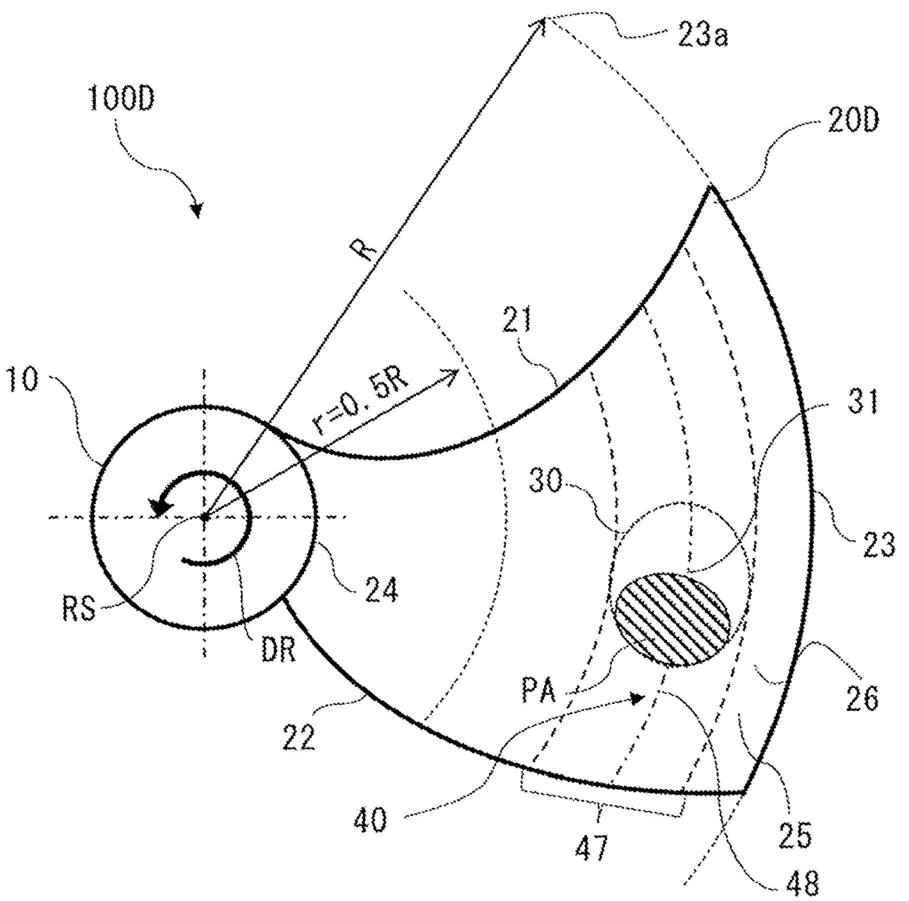
FIG. 14 is a front view schematically showing a configuration of a blade of an axial fan according to Embodiment 5.
Figure 15:
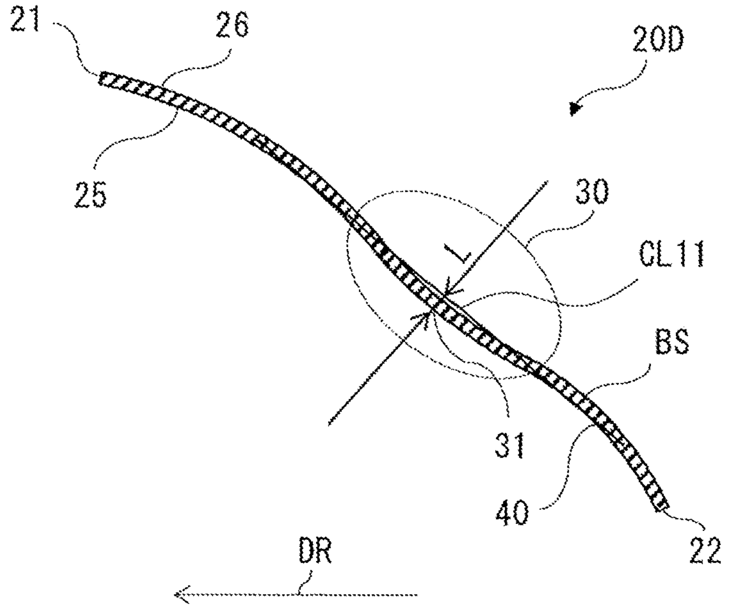
FIG. 15 is a sectional view of the blade of FIG. 14 as taken along a direction of rotation passing through a projection portion of the blade.

FIG. 14 is a front view schematically showing a configuration of a blade 20D of an axial fan 100D according to Embodiment 5. FIG. 15 is a sectional view of the blade 20D of FIG. 14 as taken along a direction of rotation passing through a projection portion 30 of the blade 20D. The configuration of the blade 20D is described in detail with reference to FIGS. 14 and 15. Components identical to those of the axial fan 100 or other axial fans of FIGS. 1 to 13 are given identical reference signs, and a description of such components is omitted. An area 47 shown in FIG. 14 is an example of an area in which the projection portion 30 is provided in the direction of the radius. A curve 48 indicated by a dot-and-dash line in FIG. 14 shows an example of a position in the direction of the radius in which a projection top 31 having a largest amount of projection is provided. The positions of the area 47 and the curve 48 in FIG. 14 are examples, and the area 47 and the curve 48 are not limited to these positions.

A blade section BS of the blade 20D of the axial fan 100D is a first blade section, and is the same in configuration as the blade section BS of the blade 20 of the axial fan 100. Accordingly, the blade section BS, which is a first section of the blade 20D, is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20D of the axial fan 100D has the projection portion 30, the projection top 31, and a rear edge recess portion 40 in the blade section BS. The axial fan 100D according to Embodiment 5 is intended to further specify the position of the projection portion 30.

Note here that a distance between a first straight line CL11 touching a portion of the pressure surface 25 that is closer to the front edge portion 21 than is the projection portion 30 and a portion of the pressure surface 25 that is closer to the rear edge portion 22 than is the projection portion 30 and the projection top 31, which projects most in a direction normal to the first straight line CL11, is defined as a distance L in the blade section BS. The first straight line CL11 shown in FIG. 15 is for example a straight line touching the portion of the pressure surface 25 that serves as the front edge recess portion 45 shown in FIG. 10 and the portion of the pressure surface 25 that serves as the rear edge recess portion 40 shown in FIG. 10. The axial fan 100D is configured such that in a case in which a distance between the rotation shaft RS and an outermost peripheral position 23*a* of the outer periphery edge portion 23 is a distance R, a place in the direction of the radius of the axial fan 100 in which the distance L reaches its maximum is a place at a distance 0.5R or longer. That is, the projection top 31, which is a top of the projection portion 30, is provided in a place at a distance 0.5R or longer in the direction of the radius.

[Axial Fan 100D]

In general, an axial fan increases in output such as a volume of air and a pressure during rotation and increases in efficiency toward the outer periphery in the direction of the radius. As mentioned above, by having the projection portion 30, the axial fan 100D generates a flow of gas of a radial component toward the inner periphery, thereby making it possible to reduce leakage of gas flowing from the pressure surface 25 toward the suction surface 26 at the outer periphery edge portion 23 and inhibit the growth of a blade tip vortex. Furthermore, as the projection top 31, at which the projection portion 30 has the largest amount of projection, is provided toward the outer periphery in the direction of the radius, the axial fan 100D can cause a flow drawn toward the inner periphery to move toward the outer periphery in the direction of the radius of the fan. Therefore, the axial fan 100D can increase output such as a volume of air and a pressure during rotation, attain higher efficiency, and make fan input less than in a case in which the projection top 31 is provided in a place at a distance 0.5R or shorter in the direction of the radius.

Embodiment 6

[Axial Fan 100E]

Figure 16:
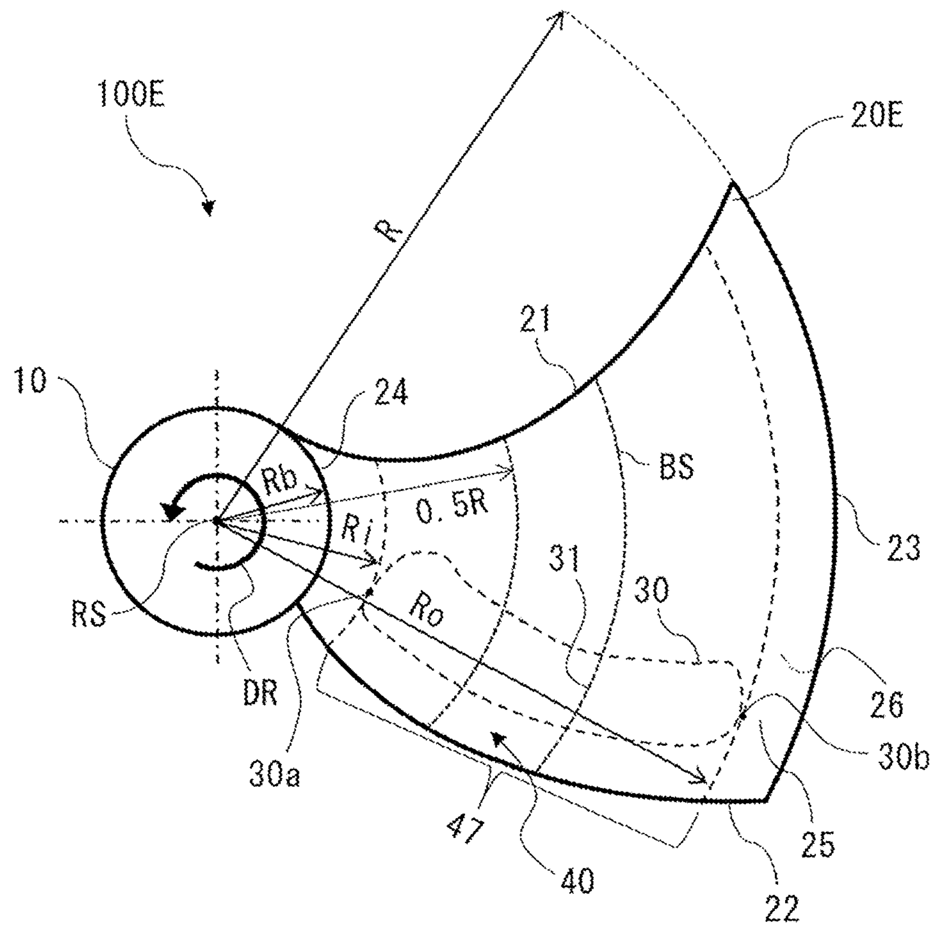
FIG. 16 is a front view schematically showing a configuration of a blade of an axial fan according to Embodiment 6.

FIG. 16 is a front view schematically showing a configuration of a blade 20E of an axial fan 100E according to Embodiment 6. The configuration of the blade 20E is described in detail with reference to FIG. 16. Components identical to those of the axial fan 100 or other axial fans of FIGS. 1 to 15 are given identical reference signs, and a description of such components is omitted. An area 47 shown in FIG. 16 is an example of an area in which the projection portion 30 is provided in the direction of the radius. The range and the position of the area 47 in FIG. 16 are examples, and the area 47 is not limited to the range or the position.

A blade section BS that is a first section of the blade 20E is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20E of the axial fan 100E has the projection portion 30, a projection top 31, and a rear edge recess portion 40 in the blade section BS. The axial fan 100E according to Embodiment 6 is intended to further specify the shape of the projection portion 30.

In the direction of the radius of the axial fan 100E, a distance between the rotation shaft RS and a position 30*a* of a portion of the projection portion 30 close to the inner periphery is defined as a distance Ri, and a distance between the rotation shaft RS and a position 30*b* of a portion of the projection portion 30 close to the outer periphery is defined as a distance Ro. Further, the radius of the hub 10 centered at the rotation shaft RS is defined as a distance Rb, and a distance between the rotation shaft RS and the outermost peripheral position 23*a* of the outer periphery edge portion 23 is defined as a distance R. In this case, the axial fan 100E is configured such that the projection portion 30 satisfies Distance Ri<Distance Ro<Distance R and Distance Rb<Distance Ri<Distance 0.5R, That is, the projection portion 30 is closer to the inner periphery than is a center between the rotation shaft RS and the outermost peripheral position 23*a* of the outer periphery edge portion 23. As shown in FIG. 16, the projection portion 30 may radially extend.

Figure 17:
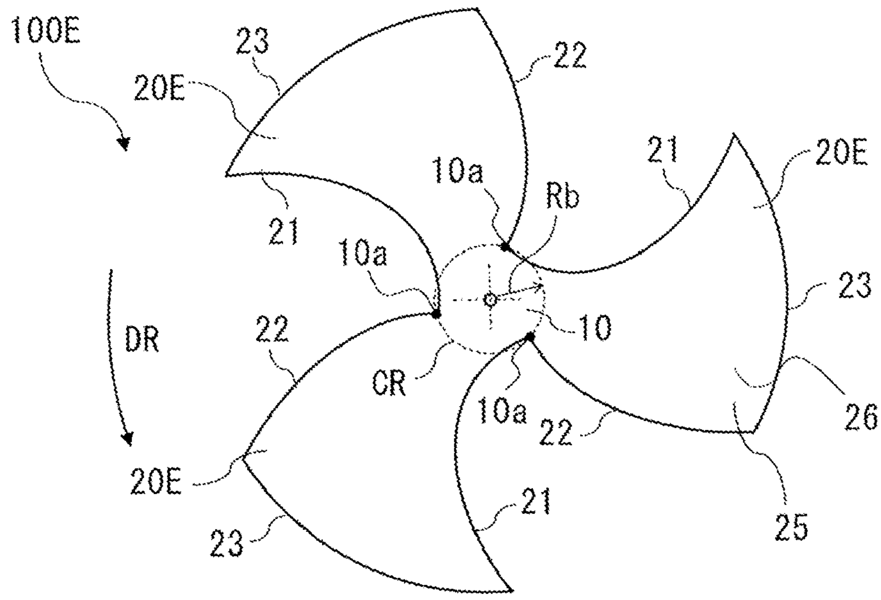
FIG. 17 is a front view of a blade of a modification of the axial fan according to Embodiment 6.

FIG. 17 is a front view of a blade 20E of a modification of the axial fan 100E according to Embodiment 6. In the axial fan 100E, in which two or more blades 20E circumferentially adjacent to each other are connected to each other, the distance Rb is the radius of a circle CR connecting vertices 10*a* at each of which two adjacent blades 20E are connected to each other. The axial fan 100E of the modification is configured such that Distance Ri<Distance Ro<Distance R and Distance Rb<Distance Ri<Distance 0.5R hold.

[Effects of Axial Fan 100E]

The axial fan 100E is configured such that the projection portion 30 satisfies Distance Ri<Distance Ro<Distance R and Distance Rb<Distance Ri<Distance 0.5R and radially extends. As the projection portion 30 extends toward the inner periphery in the direction of the radius of the axial fan 100E, the axial fan 100E can further increase the flow of gas of a radial component toward the inner periphery than can an axial fan having a projection portion 30 that does not radially extend. As a result, the axial fan 100E can reduce leakage of gas flowing from the pressure surface 25 toward the suction surface 26 at the outer periphery edge portion 23.

Embodiment 7

[Axial Fan 100F]

Figure 18:
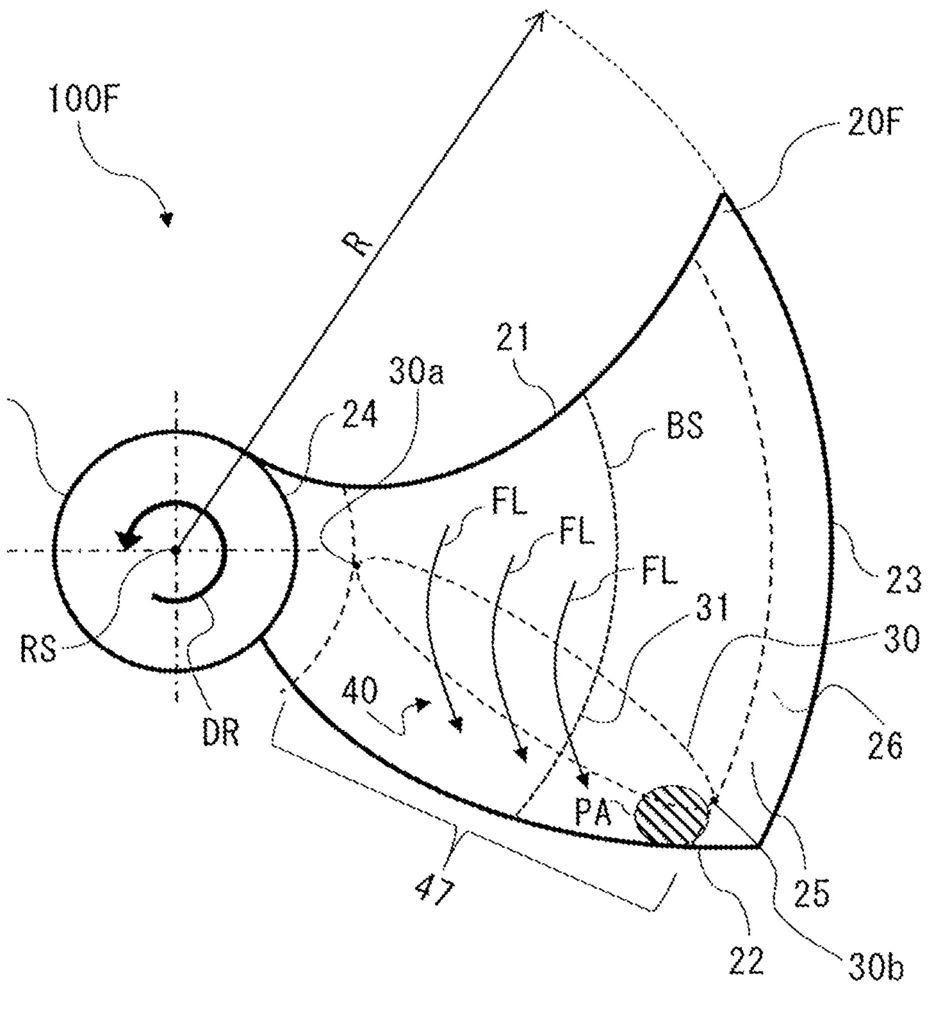
FIG. 18 is a front view schematically showing a configuration of a blade of an axial fan according to Embodiment 7.

FIG. 18 is a front view schematically showing a configuration of a blade 20F of an axial fan 100F according to Embodiment 7. The configuration of the blade 20F is described in detail with reference to FIG. 18. Components identical to those of the axial fan 100 or other axial fans of FIGS. 1 to 17 are given identical reference signs, and a description of such components is omitted. An area 47 shown in FIG. 18 is an example of an area in which the projection portion 30 is provided in the direction of the radius. The range and the position of the area 47 in FIG. 18 are examples, and the area 47 is not limited to the range or the position.

A blade section BS that is a first section of the blade 20F is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20F of the axial fan 100E has the projection portion 30, a projection top 31, and a rear edge recess portion 40 in the blade section BS. The axial fan 100E according to Embodiment 7 is intended to further specify the shape of the projection portion 30 of the axial fan 100E according to Embodiment 6. Accordingly, the axial fan 100F is configured such that the projection portion 30 satisfies Distance Ri<Distance Ro<Distance R and Distance Rb<Distance Ri<Distance 0.5R. That is, the projection portion 30 is closer to the inner periphery than is a center between the rotation shaft RS and the outermost peripheral position 23*a* of the outer periphery edge portion 23. Further, as shown in FIG. 18, the projection portion 30 radially extends.

The axial fan 100F is configured such that the projection portion 30 extends away from the rear edge portion 22 toward the front edge portion 21 as the projection portion 30 extends from the outer periphery toward the inner periphery in the direction of the radius of the axial fan 100F. That is, the axial fan 100F is configured such that in the direction of rotation DR, the position 30*a* of the portion of the projection portion 30 close to the inner periphery is closer to the front edge portion 21 than is the position 30*b* of the portion of the projection portion 30 close to the outer periphery. Further, the axial fan 100F is configured such that in the direction of rotation DR, the position 30*b* of the portion of the projection portion 30 close to the outer periphery is closer to the rear edge portion 22 than is the position 30*a* of the portion of the projection portion 30 close to the inner periphery.

[Effects of Axial Fan 100F]

The axial fan 100F is configured such that as the portion of the projection portion 30 close to the inner periphery is close to the front edge portion 21 and the portion of the projection portion 30 close to the outer periphery is close to the rear edge portion 22, the reduced-pressure area PA behind the projection portion 30 shifts toward the rear edge portion 22 in a direction toward the outer periphery. As a flow of gas on a blade surface tends to pass through an area that is relatively lower in pressure than its surrounding, the axial fan 100F causes a flow of gas having flowed into the blade 20 on the inner periphery to move toward the outer periphery. Therefore, the axial fan 100F can cause the flow of gas to move toward the outer periphery in the direction of the radius of the axial fan 100. Therefore, the axial fan 100E can increase output such as a volume of air and a pressure during rotation, attain higher efficiency, and make fan input less than in a case in which the projection portion 30 extends in a direction parallel to the direction of the radius.

Embodiment 8

[Axial Fan 100G]

Figure 19:
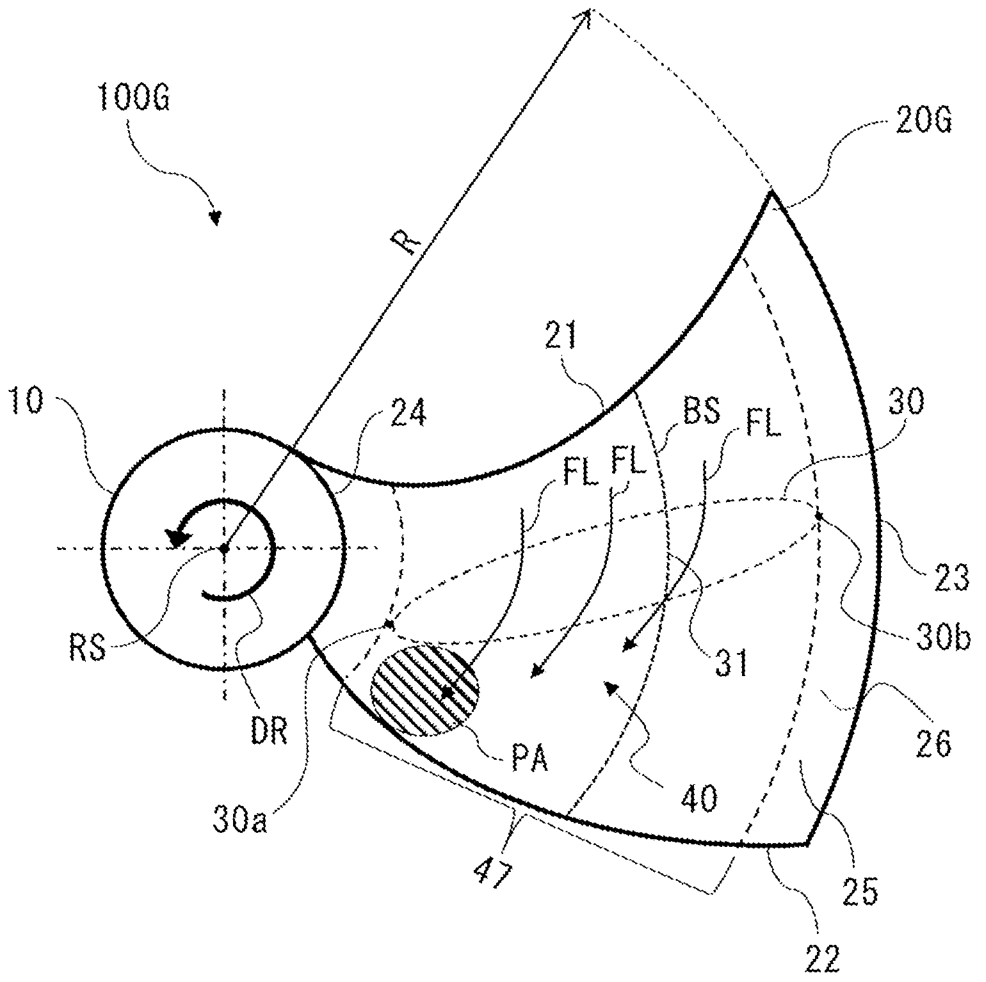
FIG. 19 is a front view schematically showing a configuration of a blade of an axial fan according to Embodiment 8.

FIG. 19 is a front view schematically showing a configuration of a blade 20G of an axial fan 100G according to Embodiment 8. The configuration of the blade 20G is described in detail with reference to FIG. 19. Components identical to those of the axial fan 100 or other axial fans of FIGS. 1 to 18 are given identical reference signs, and a description of such components is omitted. An area 47 shown in FIG. 19 is an example of an area in which the projection portion 30 is provided in the direction of the radius. The range and the position of the area 47 in FIG. 19 are examples, and the area 47 is not limited to the range or the position.

A blade section BS that is a first section of the blade 20G is a section of a portion between the front edge portion 21 and the rear edge portion 22 of the blade 20 along the direction of rotation DR of the blade 20, and is an area that is further inward than is the outer periphery edge portion 23, which is a most radially outer periphery. Further, the blade 20G of the axial fan 100G has the projection portion 30, a projection top 31, and a rear edge recess portion 40 in the blade section BS, The axial fan 100G according to Embodiment 8 is intended to further specify the shape of the projection portion 30 of the axial fan 100E according to Embodiment 6. Accordingly, the axial fan 100G is configured such that the projection portion 30 satisfies Distance Ri<Distance Ro<Distance R and Distance Rb<Distance Ri<Distance 0.5R. That is, the projection portion 30 is closer to the inner periphery than is a center between the rotation shaft RS and the outermost peripheral position 23*a* of the outer periphery edge portion 23. Further, as shown in FIG. 19, the projection portion 30 radially extends.

The axial fan 100G is configured such that the projection portion 30 extends away from the front edge portion 21 toward the rear edge portion 22 as the projection portion 30 extends from the outer periphery toward the inner periphery in the direction of the radius of the axial fan 100G. That is, the axial fan 100G is configured such that in the direction of rotation DR, the position 30*a* of the portion of the projection portion 30 close to the inner periphery is closer to the rear edge portion 22 than is the position 30*b* of the portion of the projection portion 30 dose to the outer periphery. Further, the axial fan 100G is configured such that in the direction of rotation DR, the position 30*b* of the portion of the projection portion 30 close to the outer periphery is closer to the front edge portion 21 than is the position 30*a* of the portion of the projection portion 30 close to the inner periphery.

[Effects of Axial Fan 100G]

In general, a contribution of output from an axial fan increases on the outer periphery of the axial fan as an outside unit is configured to produce a higher pressure loss. Moreover, when the contribution of the output from the axial fan increases on the outer periphery of the axial fan, there is an increase in flow of gas toward a radially outer periphery of the axial fan. In such an outdoor unit configured to produce a high pressure loss, it is necessary to ensure a sufficient flow of gas of a radial component toward the inner periphery. The axial fan 100G is configured such that the projection portion 30 extends away from the front edge portion 21 toward the rear edge portion 22 as the projection portion 30 extends from the outer periphery toward the inner periphery in the direction of the radius of the axial fan 100G. The axial fan 100G is configured such that as the portion of the projection portion 30 close to the inner periphery is close to the rear edge and the portion of the projection portion 30 close to the outer periphery is close to the front edge, the reduced-pressure area PA behind the projection portion 30 shifts toward the rear edge portion 22 in a direction toward the inner periphery. Therefore, the axial fan 100F can further increase the flow of gas of the radial component toward the inner periphery and reduce leakage of gas flowing from the pressure surface 25 toward the suction surface 26 at the outer periphery edge portion 23 even in an outdoor unit with a high pressure loss.

Embodiment 9

[Axial Fan 100H]

Figure 20:
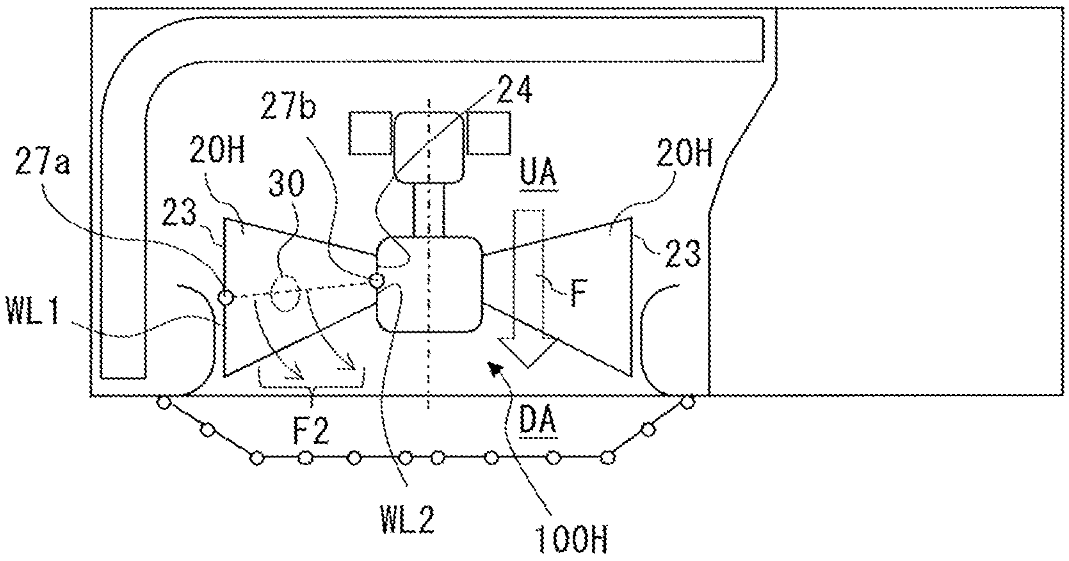
FIG. 20 is a diagram showing an example of a shape formed by a revolved projection of an axial fan according to Embodiment 9 onto a meridian plane.
Figure 21:
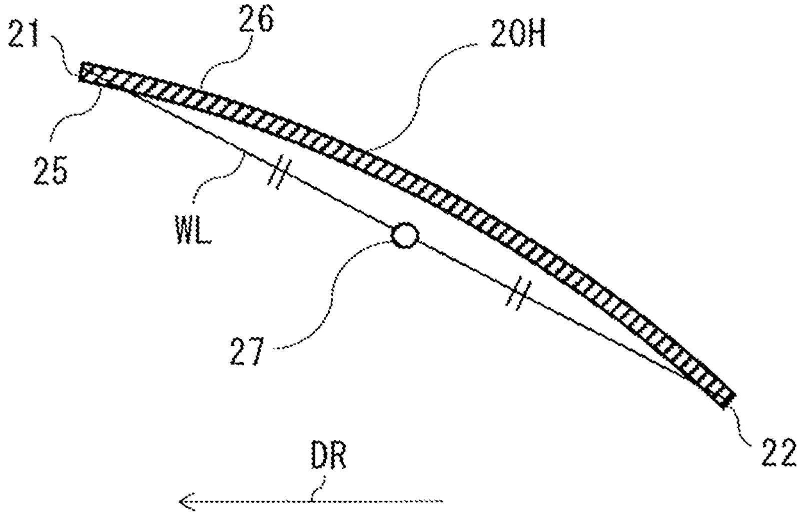
FIG. 21 is a diagram explaining a configuration of a blade section of a blade shown in FIG. 20.

FIG. 20 is a diagram showing an example of a shape formed by a revolved projection of an axial fan 100H according to Embodiment 9 onto a meridian plane. That is, FIG. 20 is a side view of an area in which blades 20H are present when the axial fan 100H is rotated. In FIG. 20, the solid-white arrow F indicates the direction in which gas flows. When the axial fan 100H operates, the gas flows from an upstream side UA to a downstream side DA of the axial fan 100H. FIG. 21 is a diagram explaining a configuration of a blade section of a blade 20H shown in FIG. 20. The configuration of the axial fan 100H is described in detail with reference to FIGS. 20 and 21. Components identical to those of the axial fan 100 or other axial fans of FIGS. 1 to 19 are given identical reference signs, and a description of such components is omitted.

The blade 20H shown in FIG. 21 is represented by a vertical section exposed by making a straight cut through a portion of the blade 20H that has no projection portion 30, on identical radii centered at the rotation shaft RS. A virtual straight line connecting the front edge portion 21 and the rear edge portion 22 of the blade 20H is defined as a chord line WL, and the midpoint of the chord line WL is defined as a chord midpoint 27.

With reference back to FIG. 20, a configuration of the axial fan 100H is described. The axial fan 100H is configured such that in a shape of the blade 20 formed by a revolved projection onto a meridian plane including the rotation shaft RS and the blade 20, a first chord midpoint 27*a* is further downstream in an airflow generated by rotation of the blade 20 than a second chord midpoint 27*b* in an axial direction of the rotation shaft RS.

The first chord midpoint 27*a* is a chord midpoint 27 of a first chord line WL1 located on identical radii centered at the rotation shaft RS, and the first chord line WL1 is a chord line WL located on the outermost periphery of the blade 20. Further, the second chord midpoint 27*b* is the midpoint of a second chord line WL2 located on identical radii centered at the rotation shaft RS, and the second chord line WL2 is a chord line WL located on the innermost periphery of the blade 20. In the axial fan 100E, in which two or more blades 20E circumferentially adjacent to each other are connected to each other, the position of the circle CR connecting vertices 10*a* at each of which two adjacent blades 20E are connected to each other is the innermost peripheral position.

The first chord midpoint 27*a* and the second chord midpoint 27*b* are not limited to the above configuration obtained by a revolved projection onto a meridian plane. For example, the first chord midpoint 27*a* may be the midpoint of the first chord line WL1 at the outer periphery edge portion 23, and the second chord midpoint 27$b$ may be the midpoint of the second chord line WL2 at the inner periphery edge portion 24.

[Effects of Axial Fan 100H]

In a shape of the blade 20 formed by a revolved projection onto a meridian plane including the rotation shaft RS and the blade 20, the first chord midpoint 27$a$ is further downstream in an airflow generated by rotation of the blade 20 than the second chord midpoint 27$b$ in the axial direction of the rotation shaft RS. By having the most radially outer periphery chord midpoint situated further downstream than the most radially inner periphery chord midpoint in the axial direction, the axial fan 100H applies an inward force from the blade 20 to the airflow to generate a radially inward flow of gas during driving as indicated by arrows F2 in FIG. 20. Further, the axial fan 100H has a projection portion 30. Having the projection portion 30 allows the axial fan 100H to reduce leakage of gas flowing from the pressure surface 25 toward the suction surface 26 at the outer periphery edge portion 23. By having the projection portion 30 and having the most radially outer periphery chord midpoint situated further downstream than the most radially inner periphery chord midpoint in the axial direction, the axial fan 100H thus configured brings about a combined effect of further reducing leakage of gas flowing from the pressure surface 25 toward the suction surface 26 at the outer periphery edge portion 23.

Embodiment 10

[Axial Fan 100I]

Figure 22:
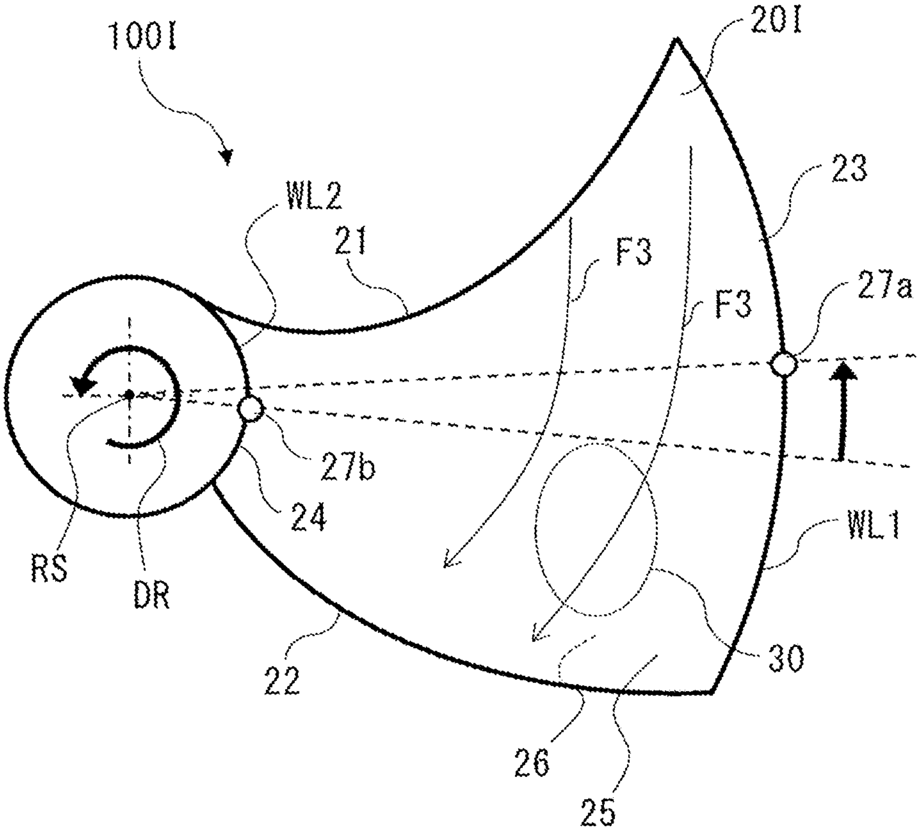
FIG. 22 is a front view schematically showing a configuration of a blade of an axial fan according to Embodiment 10.

FIG. 22 is a front view schematically showing a configuration of a blade 20I of an axial fan 100I according to Embodiment 10. FIG. 22 shows the blade 20I in a plan view of the blade 20I as seen parallel to an axial direction of the rotation shaft RS. The configuration of the blade 20I is described in detail with reference to FIGS. 21 and 22. Components identical to those of the axial fan 100 or other axial fans of FIGS. 1 to 21 are given identical reference signs, and a description of such components is omitted.

The blade 20I is similar to the blade 20H of FIG. 21. Accordingly, a virtual straight line connecting the front edge portion 21 and the rear edge portion 22 of the blade 20I is defined as a chord line WL, and the midpoint of the chord line WL is defined as a chord midpoint 27.

As shown in FIG. 22, the axial fan 100I is configured such that in a shape of the blade 20 in a plan view of the blade 20I as seen parallel to the axial direction of the rotation shaft RS, a first chord midpoint 27$a$ is further forward than a second chord midpoint 27$b$ in the direction of rotation DR.

The first chord midpoint 27$a$ is a chord midpoint 27 of a first chord line WL1 located on identical radii centered at the rotation shaft RS, and the first chord line WL1 is a chord line WL located on the outermost periphery of the blade 20. Further, the second chord midpoint 27$b$ is the midpoint of a second chord line WL2 located on identical radii centered at the rotation shaft RS, and the second chord line WL2 is a chord line WL located on the innermost periphery of the blade 20. In the axial fan 100E, in which two or more blades 20E circumferentially adjacent to each other are connected to each other, the position of the circle CR connecting vertices 10$a$ at each of which two adjacent blades 20E are connected to each other is the innermost peripheral position.

The first chord midpoint 27$a$ and the second chord midpoint 27$b$ are not limited to the above configuration. For example, the first chord midpoint 27$a$ may be the midpoint of the first chord line WL1 at the outer periphery edge portion 23, and the second chord midpoint 27$b$ may be the midpoint of the second chord line W1.2 at the inner periphery edge portion 24.

[Effects of Axial Fan 100I]

The axial fan 100I is configured such that in a shape of the blade 20 in a plan view of the blade 20I as seen parallel to the axial direction of the rotation shaft RS, a first chord midpoint 27$a$ is further forward than a second chord midpoint 27$b$ in the direction of rotation DR. By having the most radially outer periphery chord midpoint situated further forward than the most radially inner periphery chord midpoint in the direction of rotation, the axial fan 100I applies an inward force from the blade 20 to the airflow to generate a radially inward flow of gas during driving as indicated by arrows F3 in FIG. 22. Further, the axial fan 100I has a projection portion 30. Having the projection portion 30 allows the axial fan 100I to reduce leakage of gas flowing from the pressure surface 25 toward the suction surface 26 at the outer periphery edge portion 23. By having the projection portion 30 and having the most radially outer periphery chord midpoint situated further forward than the most radially inner periphery chord midpoint in the direction of rotation, the axial fan 100H thus configured brings about a combined effect of further reducing leakage of gas flowing from the pressure surface 25 toward the suction surface 26 at the outer periphery edge portion 23.

Embodiment 11

[Refrigeration Cycle Apparatus 70]

Embodiment 11 illustrates a case in which the axial fan 100 or other axial fans of Embodiments 1 to 10 are applied to an outdoor unit 50 serving as an air-sending device in a refrigeration cycle apparatus 70.

Figure 23:
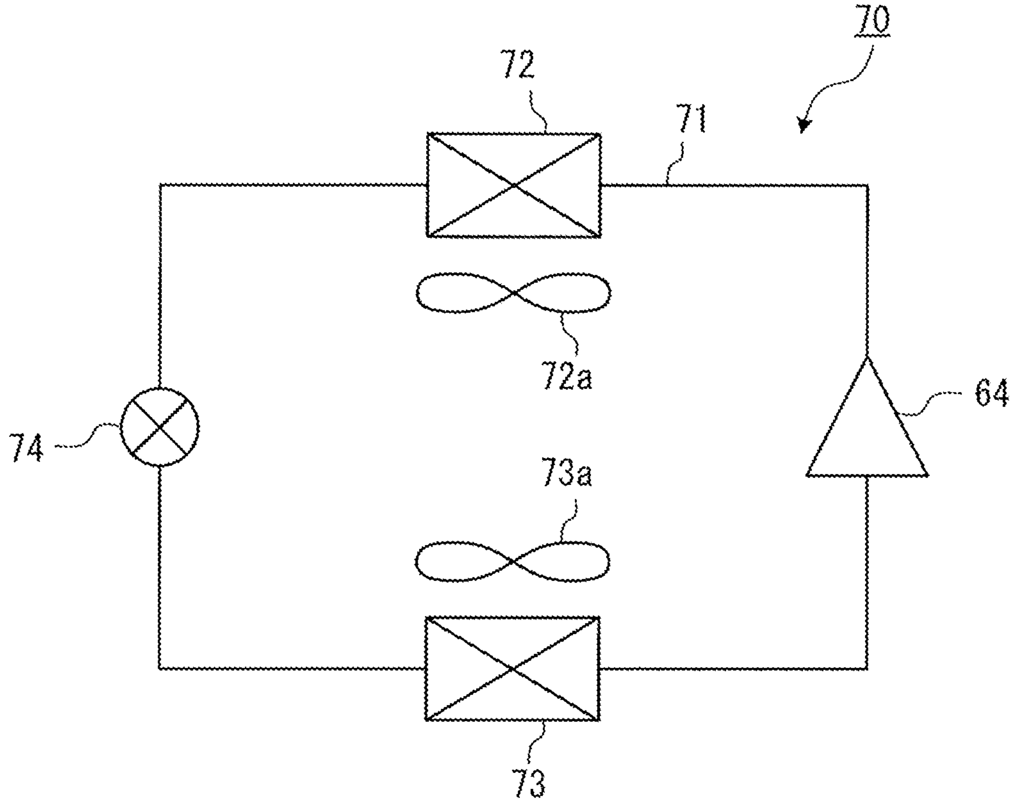
FIG. 23 is a schematic view of a refrigeration cycle apparatus according to Embodiment 11.

FIG. 23 is a schematic view of the refrigeration cycle apparatus 70 according to Embodiment 11. While the following describes a case in which the refrigeration cycle apparatus 70 is used in air conditioning, the refrigeration cycle apparatus 70 is not limited to use in air conditioning. The refrigeration cycle apparatus 70 is used for example in a refrigerator, a freezer, an automatic vending machine, an air-conditioning apparatus, a refrigerating apparatus, or a water heater for a freezing or air-conditioning purpose.

As shown in FIG. 23, the refrigeration cycle apparatus 70 includes a refrigerant circuit 71 connecting a compressor 64, a condenser 72, an expansion valve 74, and an evaporator 73 in sequence by refrigerant pipes. The condenser 72 is provided with a condenser fan 72$a$ configured to send air to the condenser 72 for use in heat exchange. Further, the evaporator 73 is provided with an evaporator fan 73$a$ configured to send air to the evaporator 73 for use in heat exchange. At least either the condenser fan 72$a$ or the evaporator fan 73$a$ is the axial fan 100 or other axial fans of Embodiments 1 to 10. By providing the refrigerant circuit 71 with a flow switch device, such as a four-way valve, configured to switch the flows of refrigerant, the refrigeration cycle apparatus 70 may be configured to switch between heating operation and cooling operation.

Figure 24:
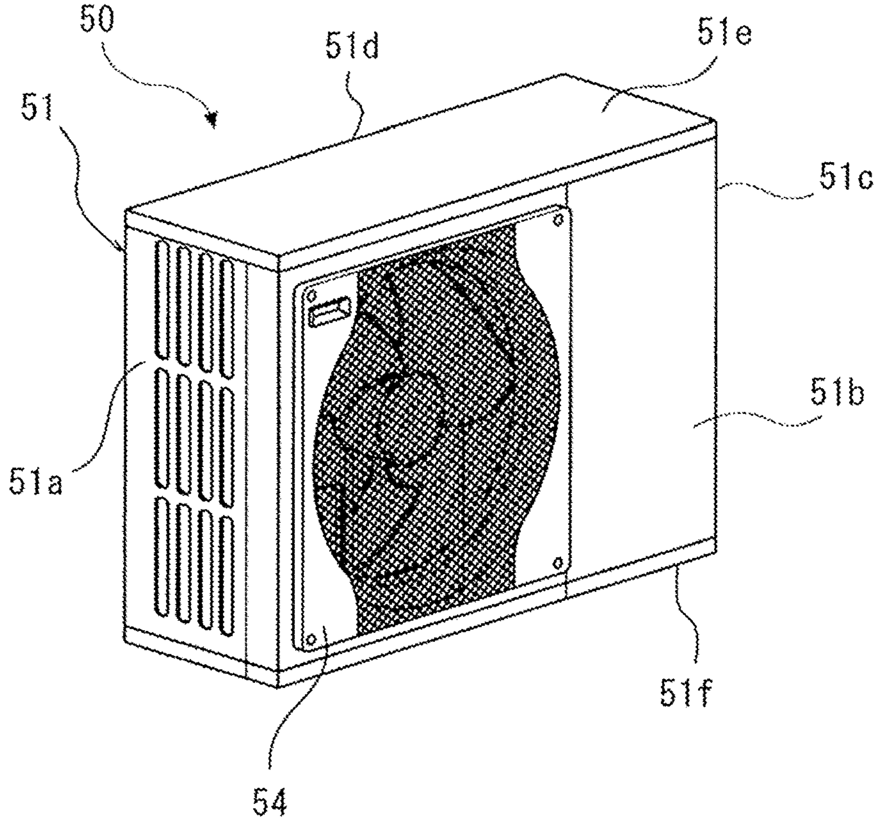
FIG. 24 is a perspective view of an outdoor unit serving as an air-sending device as seen from an air outlet side.
Figure 25:
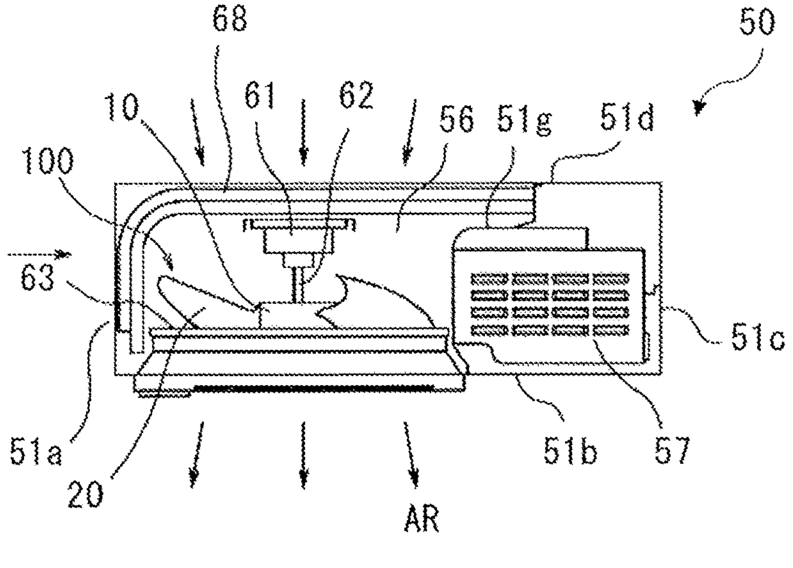
FIG. 25 is a diagram for explaining a configuration of the outdoor unit from the top.
Figure 26:
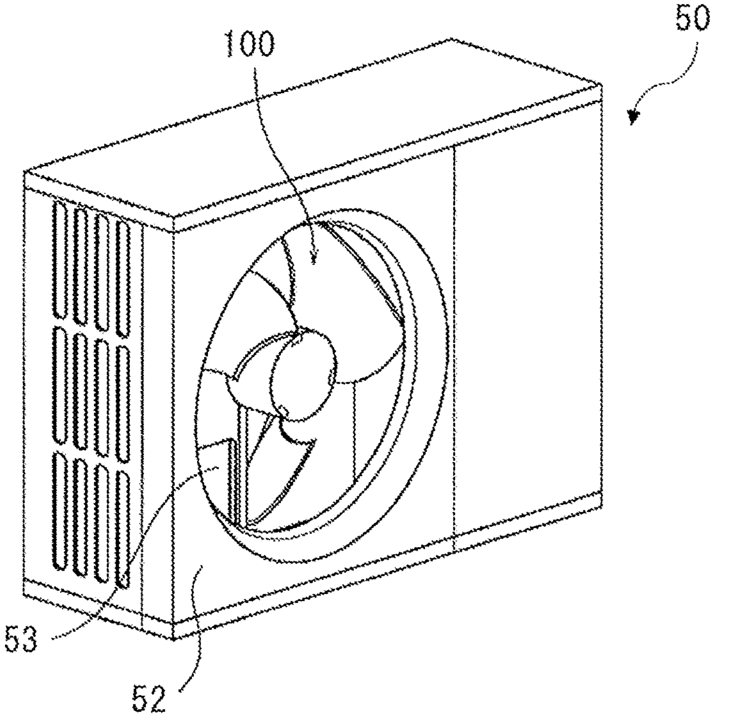
FIG. 26 is a diagram showing a state in which a fan grille has been removed from the outdoor unit.
Figure 27:
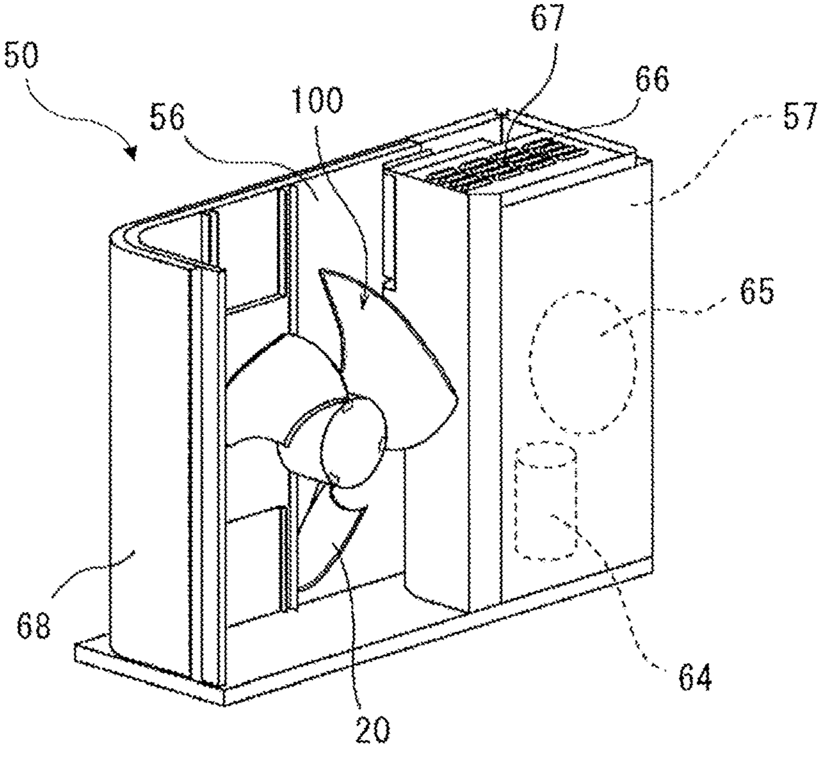
FIG. 27 is a diagram showing an internal configuration of the outdoor unit with the fan grille, a front panel, and other components removed from the outdoor unit.

FIG. 24 is a perspective view of the outdoor unit 50, which is an air-sending device, as seen from an air outlet side. FIG. 25 is a diagram for explaining a configuration of the outdoor unit 50 from the top. FIG. 26 is a diagram showing a state in which a fan grille has been removed from the outdoor unit 50. FIG. 27 is a diagram showing an internal configuration of the outdoor unit 50 with the fan grille, a front panel, and other components removed from the outdoor unit 50.

As shown in FIGS. 23 to 27, an outdoor unit body 51 serving as a casing is formed as a housing having a pair of left and right side surfaces 51*a* and 51*c*, a front surface 51*b*, a back surface 51*d*, a top surface 51*e*, and a bottom surface 51*f*. The side surface 51*a* and the back surface 51*d* are provided with openings through which air is suctioned from outside. Further, in the front surface 51*b*, a front panel 52 is provided with an air outlet 53 serving as an opening through which air is blown out. Furthermore, the air outlet 53 is covered with a fan grille 54 so that safety measures are taken by preventing contact between an object outside the outdoor unit body 51 and the axial fan 100. The arrow AR of FIG. 25 indicates the flow of air.

The outdoor unit body 51 houses the axial fan 100 and a fan motor 61. The axial fan 100 is connected to the fan motor 61, which is a drive source provided to the back surface 51*d*, with a rotation shaft 62 interposed between the axial fan 100 and the fan motor 61, and is driven by the fan motor 61 to rotate. The fan motor 61 applies a drive force to the axial fan 100.

The outdoor unit body 51 has its interior divided by a divider 51*g* serving as a wall into a blast room 56 in which the axial fan 100 is placed and a machine room 57 in which the compressor 64 or other machines are placed. In the blast room 56, the side surface 51*a* and the back surface 51*d* are provided with a heat exchanger 68 extending in a substantially L shape in a plan view. The heat exchanger 68 is used as the condenser 72 during heating operation and is used as the evaporator 73 during cooling operation.

A bellmouth 63 is disposed further radially outward than the axial fan 100 disposed in the blast room 56. The bellmouth 63 surrounds the outer periphery of the axial fan 100 and rectifies a flow of gas formed by the axial fan 100 or other axial fans. The bellmouth 63 is located further outward than an outer peripheral end of each of the blades 20, and has an annular shape along the direction of rotation of the axial fan 100. Further, the divider 51*g* is located at one side of the bellmouth 63, and a part of the heat exchanger 68 is located at the other side of the bellmouth 63.

The bellmouth 63 has its front edge connected to the front panel 52 of the outdoor unit 50 such that the front edge surrounds the outer periphery of the air outlet 53. The bellmouth 63 may be integrated with the front panel 52 or may be prepared as a separate part to be connected to the front panel 52, A flow passage between a suction side and a blowout side of the bellmouth 63 is formed by the bellmouth 63 as an air trunk near the air outlet 53. That is, the air trunk near the air outlet 53 is separated by the bellmouth 63 from another space in the blast room 56.

The heat exchanger 68, which is provided at a suction side of the axial fan 100, includes a plurality of fins arranged such that plate surfaces are parallel to each other and heat-transfer pipes each passing through the fins in the direction in which the fins are arranged. Refrigerant circulating through the refrigerant circuit flows through the heat-transfer pipes. The heat exchanger 68 of the present embodiment is configured such that the heat-transfer pipes extend in an L shape from the side surface 51*a* to the back surface 51*d* of the outdoor unit body 51 and a plurality of heat-transfer pipes meander through the fins. Further, the heat exchanger 68 forms the refrigerant circuit 71 of the air-conditioning apparatus by being connected to the compressor 64 via a pipe 65 or other parts and further connected to an indoor-side heat exchanger, an expansion valve, or other components (not illustrated). Further, the machine room 57 accommodates a substrate box 66 containing a control substrate 67 configured to control the pieces of equipment mounted in the outdoor unit.

[Function Effects of Refrigeration Cycle Apparatus 70]

Embodiment 11 brings about advantages that are similar to those of a corresponding one of Embodiments 1 to 10. For example, as mentioned above, the axial fans 100 to 100I can reduce leakage of gas flowing from the pressure surface 25 toward the suction surface 26 at the outer periphery edge portion 23. Further, the axial fan 100 or other axial fans can attain a high static pressure by reducing the leakage of gas flowing from the pressure surface 25 toward the suction surface 26 at the outer periphery edge portion 23. Moreover, as the axial fan 100 or other axial fans can attain a higher static pressure, the axial fan 100 or other axial fans can reduce fan input by bringing about improvement in fan efficiency. Further, as the axial fan 100 or other axial fans can ensure the required volume of air at a lower rotation frequency, the axial fan 100 or other axial fans can reduce noise. Mounting any one or more of these axial fans 100 to 100I in the air-sending device allows the air-sending device to reduce fan input and reduce noise. Further, mounting the axial fan 100 or other axial fans in an air conditioner or a hot water supply outdoor unit that is the refrigeration cycle apparatus 70 formed by the compressor 64 and the heat exchanger and other components makes it possible to attain a large volume of air passing through the heat exchanger with low noise and high efficiency and allows the pieces of equipment to achieve reduced noise and improved energy conservation.

Embodiment 12

Figure 28:
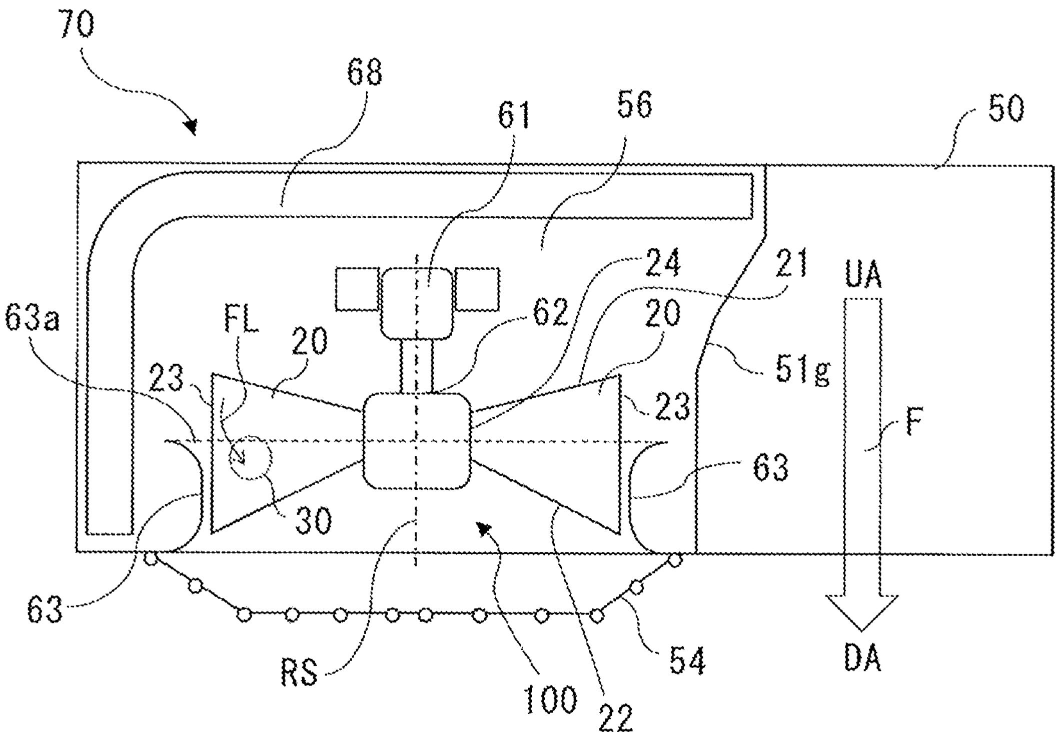
FIG. 28 is a diagram for explaining a configuration of an outdoor unit from the top of a refrigeration cycle apparatus according to Embodiment 12.

FIG. 28 is a diagram for explaining a configuration of an outdoor unit 50 from the top of a refrigeration cycle apparatus 70 according to Embodiment 12. The refrigeration cycle apparatus 70 according to Embodiment 12 is intended to further specify the configuration of the refrigeration cycle apparatus according to Embodiment 11. Components identical to those of the axial fan 100 or other axial fans of FIGS. 1 to 22 and those of the refrigeration cycle apparatus 70 of FIGS. 23 to 27 are given identical reference signs, and a description of such components is omitted. A case is described in which the axial fan 100 or other axial fans according to Embodiments 1 to 10 are applied to the outdoor unit 50, which serves as an air-sending device, of the refrigeration cycle apparatus 70 according to Embodiment 11. In the following description, any one of the axial fans 100 to 100I according to Embodiments 1 to 10 is applied to the description of the axial fan 100.

In FIG. 28, the solid-white arrow F indicates the direction in which gas flows. When the axial fan 100 operates, the gas flows from an upstream side UA to a downstream side DA of the axial fan 100 in the blast room 56. The refrigeration cycle apparatus 70 according to Embodiment 12 is configured such that the projection portion 30 is disposed in a position that is identical to a position of an upstream end portion 63*a* of the bellmouth 63 in an axial direction of the rotation shaft RS or entirely disposed in the bellmouth 63.

[Function Effects of Refrigeration Cycle Apparatus 70]

When there occurs leakage of gas flowing from the pressure surface 25 toward the suction surface 26 at the outer periphery edge portion 23 of the axial fan 100, the gas collides with the bellmouth 63, which surrounds the axial fan 100, to be a great noise source. Therefore, the outdoor unit 50, which is an air-sending device, is configured such that the projection portion 30 of the axial fan 100 is disposed in a position that is identical to a position of an upstream end portion 63*a* of the bellmouth 63 in an axial direction of the rotation shaft RS or entirely disposed in the bellmouth 63.

By including this configuration, the outdoor unit 50, which is an air-sending device, can reduce leakage of gas flowing from the pressure surface 25 toward the suction surface 26 at the outer periphery edge portion 23 of the axial fan 100 or other axial fans. As a result, the outdoor unit 50 can inhibit an airflow from colliding with the bellmouth and thereby reduce noise.

The configurations shown in the foregoing embodiments show examples and may be combined with another publicly-known technology, and parts of the configurations may be omitted or changed, as long as such omissions and changes do not depart from the scope of the gist.

REFERENCE SIGNS LIST

10: hub, 10*a*: vertex, 20: blade, 20A: blade, 20B: blade, 20C: blade, 20D: blade, 20E: blade, 20F: blade, 20G: blade, 20H: blade, 20I: blade, 20L: blade, 20M: blade, 21: front edge portion, 22: rear edge portion, 23: outer periphery edge portion, 23*a*: outermost peripheral position, 24: inner periphery edge portion, 25: pressure surface, 26: suction surface, 27: chord midpoint, 27*a*: first chord midpoint, 27*b*: second chord midpoint, 28: center, 30: projection portion, 30*a*: position, 30*b*: position, 31: projection top, 40: rear edge recess portion, 45: front edge recess portion, 46: outer periphery recess portion, 47: area, 50: outdoor unit, 51: outdoor unit body, 51*a*: side surface, 51*b*: front surface, 51*c*: side surface, 51*d*: back surface, 51*e*: top surface, 51*f*: bottom surface, 51*g*: divider, 52: front panel, 53: air outlet, 54: fan grille, 56: blast room, 57: machine room, 61: fan motor, 62: rotation shaft, 63: bellmouth, 63*a*: upstream end portion, 64: compressor, 65: pipe, 66: substrate box, 67: control substrate, 68: heat exchanger, 70: refrigeration cycle apparatus, 71: refrigerant circuit, 72: condenser, 72*a*: condenser fan, 73: evaporator, 73*a*: evaporator fan, 74: expansion valve, 100: axial fan, 100A: axial fan, 100B: axial fan, 100C: axial fan, 100D: axial fan, 100E: axial fan, 100F: axial fan, 100G: axial fan, 100H: axial fan, 100I: axial fan, 100L: axial fan

The invention claimed is:

1. An axial fan, comprising:

a hub having a rotation shaft and configured to be driven to rotate; and blades provided to the hub, the blades each having a front edge portion and a rear edge portion, the front edge portion of each blade being further forward in a direction in which the blades rotate than the rear edge portion of the blade, in a first blade section that is a first section of a first portion between the front edge portion and the rear edge portion of each of the blades along the direction in which the blades rotate, the first blade section being a first area of each of the blades that is further inward than an outer periphery edge portion that is a most radially outer periphery in each of the blades, the blades each having a projection portion and a first recess portion, the projection portion projecting from a first portion of a pressure surface of each of the blades, the first recess portion receding from a second portion of the pressure surface that is between the projection portion and the rear edge portion, in a second blade section that is a second section of a portion between the front edge portion and the rear edge portion of each of the blades along the direction in which the blades rotate, the second blade section being further radially outward than the projection portion, the second blade section being a second area of each of the blades that is further inward than the outer periphery edge portion, the blades each have an outer periphery recess portion receding from a third portion of the pressure surface that is between the front edge portion and the rear edge portion in a whole of each of the blades, the projection portion having a projection top that is a top of the projection portion and is closer to the rear edge portion than is a center between the front edge portion and the rear edge portion in the first blade section, wherein the blades each have a second recess portion that is entirely concave from a fourth portion of the pressure surface that is from the projection portion to the front edge portion in the first blade section.

2. The axial fan of claim 1, wherein the outer periphery recess portion is bent and warped into an arc such that the outer periphery recess portion projects in a direction opposite to the direction in which the blades rotate and upstream in an airflow generated by rotation of the blades.

3. The axial fan of claim 1, wherein in a case in which in the first blade section, an outlet angle representing an orientation of a portion of the rear edge portion placed further rearward than the projection portion in the direction in which the blades rotate is defined as a first outlet angle and in the second blade section, an outlet angle representing an orientation of the rear edge portion is defined as a second outlet angle, the blades are each shaped such that the first outlet angle is smaller than the second outlet angle.

4. The axial fan of claim 1, wherein in a case in which a distance between the rotation shaft and an outermost peripheral position of the outer periphery edge portion is a distance R, the projection top is radially in a place at a distance 0.5R or longer.

5. The axial fan of claim 4, wherein in a case in which radially, a distance between the rotation shaft and a position of a portion of the projection portion close to an inner periphery is defined as a distance Ri, a distance between the rotation shaft and a position of a portion of the projection portion close to an outer periphery is defined as a distance Ro, and a radius of the hub centered at the rotation shaft is defined as a distance Rb, the projection portion satisfies Distance Ri<Distance Ro<Distance R and Distance Rb<Distance Ri<Distance 0.5R and radially extends.

6. The axial fan of claim 1, wherein in a case in which radially, a distance between the rotation shaft and a position of a portion of the projection portion close to an inner periphery is defined as a distance Ri, a distance between the rotation shaft and a position of a portion of the projection portion close to an outer periphery is defined as a distance Ro, a radius of the hub centered at the rotation shaft is defined as a distance Rb, and a distance between the rotation shaft and an outermost peripheral position of the outer periphery edge portion is defined as a distance R, the projection portion satisfies Distance Ri<Distance Ro<Distance R and Distance Rb<Distance Ri<Distance 0.5R and radially extends.

7. The axial fan of claim 5, wherein the projection portion extends away from the rear edge portion toward the front edge portion as the projection portion radially extends from the outer periphery toward the inner periphery.

8. The axial fan of claim 5, wherein the projection portion extends away from the front edge portion toward the rear edge portion as the projection portion radially extends from the outer periphery toward the inner periphery.

9. The axial fan of claim 1, wherein in a case in which a virtual straight line connecting the front edge portion and the rear edge portion is defined as a chord line and a midpoint of the chord line is defined as a chord midpoint, in a shape of each of the blades formed by a revolved projection onto a meridian plane including the rotation shaft and the blades, a first chord midpoint of a first chord line on identical radii of an outermost periphery of each of the blades is further downstream in an airflow generated by rotation of the blades than a second chord midpoint of a second chord line on identical radii of an innermost periphery of each of the blades in an axial direction of the rotation shaft.

10. The axial fan of claim 1, wherein in a case in which a virtual straight line connecting the front edge portion and the rear edge portion is defined as a chord line and a midpoint of the chord line is defined as a chord midpoint, in a plan view of each of the blades as seen parallel to an axial direction of the rotation shaft, a first chord midpoint of a first chord line on identical radii of an outermost periphery of each of the blades is further forward than a second chord midpoint of a second chord line on identical radii of an innermost periphery of each of the blades in the direction in which the blades rotate.

11. The axial fan of claim 9, wherein in a plan view of each of the blades as seen parallel to the axial direction of the rotation shaft, the first chord midpoint of the first chord line is further forward than the second chord midpoint of the second chord line in the direction in which the blades rotate.

12. An air-sending device, comprising:

the axial fan of claim 1;

a drive source configured to apply a drive force to the axial fan; and a casing that houses the axial fan and the drive source.

13. The air-sending device of claim 12, further comprising a bellmouth that surrounds an outer periphery of the axial fan and is configured to rectify a flow of gas formed by the axial fan, wherein the projection portion is disposed in a position that is identical to a position of an upstream end portion of the bellmouth in an axial direction of the rotation shaft or entirely disposed in the bellmouth.

14. A refrigeration cycle apparatus, comprising:

the air-sending device of claim 12; and a refrigerant circuit having a condenser and an evaporator, the air-sending device being configured to send air to at least either the condenser or the evaporator.

* * * * *